United States Patent [19]
Dent

[11] Patent Number: 6,023,477
[45] Date of Patent: Feb. 8, 2000

[54] SYSTEM AND METHOD OF TIME AND FREQUENCY SYNCHRONIZATION IN A RADIOCOMMUNICATION SYSTEM

[75] Inventor: Paul W. Dent, Pittsboro, N.C.

[73] Assignee: Ericsson Inc., Research Triangle Park, N.C.

[21] Appl. No.: 08/768,975

[22] Filed: Dec. 18, 1996

[51] Int. Cl.[7] ........................................................ H04J 3/06
[52] U.S. Cl. ............................................. 370/509; 370/350
[58] Field of Search .................................... 370/350, 318, 370/321, 337, 347, 442, 503, 507, 508, 509, 510, 511, 512, 513, 514, 515, 516; 375/356, 362, 365, 366, 367, 368

[56] References Cited

U.S. PATENT DOCUMENTS

| | | |
|---|---|---|
| 4,476,566 | 10/1984 | Dent . |
| 5,048,059 | 9/1991 | Dent . |
| 5,103,465 | 4/1992 | Crisler et al. . |
| 5,148,485 | 9/1992 | Dent . |
| 5,187,675 | 2/1993 | Dent et al. . |
| 5,343,489 | 8/1994 | Toy et al. . |
| 5,373,536 | 12/1994 | Dehner, Jr. et al. . |
| 5,539,748 | 7/1996 | Raith . |

FOREIGN PATENT DOCUMENTS

| | | |
|---|---|---|
| 0 678 991 | 10/1995 | European Pat. Off. . |
| 0 727 893 | 8/1996 | European Pat. Off. . |
| 459137 | 6/1989 | Sweden . |
| WO91/07831 | 5/1991 | WIPO . |

OTHER PUBLICATIONS

Honary, B. et al., "Improved HF Modem Using Convolutional coding," Electronics and Communications Journal, vol. 4, No. 2, pp. 73–82 (1992).

Primary Examiner—Huy D. Vu
Attorney, Agent, or Firm—Burns, Doane, Swecker & Mathis, L.L.P.

[57] ABSTRACT

A communication station such as a hand held telephone quickly identifies a desired carrier signal or time slot of a carrier signal and synchronizes itself in time and frequency to that carrier or slot. Synchronization is achieved even when frequency and time reference signals in the communication station are offset, e.g., due to drift, with respect to the carrier signal or slot by averaging successions of signal measurements that occur at times when corresponding signal values are expected. In one method, a plurality of measurements of the received signal taken at a group of predetermined time points where corresponding values are expected are averaged together, in order to enhance the signal to noise ratio. Averaging is carried out several times using different groups of time points, the groups corresponding to respective, different expected clock frequency errors. The results of the averaging steps are used in determining a best hypothesis for the received signal. Dynamic programming is used to test synchronization hypotheses based on different hypotheses of timing drift rate and to discriminate between different hypotheses of timing and timing drift rate in order to maximize sums of correlations.

60 Claims, 11 Drawing Sheets

ALLOWED AND DISALLOWED PATHS

SLOPE = 0.5 CONSTRAINT

| 4r | 3t | 64 DATA BITS | 14-BIT BEAM ID | 64 DATA BITS | 3t | 4r |

| 4r | 3t | 60 DATA BITS | 22-BIT SYNC CODE | 60 DATA BITS | 3t | 4r |

SYSTEM AND METHOD OF TIME AND FREQUENCY SYNCHRONIZATION IN A RADIOCOMMUNICATION SYSTEM

BACKGROUND

This invention relates generally to digital radio communication systems using time division multiplexing (TDM) to convey paging and traffic information, and more specifically to a method and system for locating an optimum paging channel and providing synchronization in a Time Division Multiple Access (TDMA) communication system.

In an exemplary digital radio communication system, information is exchanged by a base station and one or more mobile stations using a TDM of traffic channels, paging control channels, and/or broadcast control channels in a technique called TDMA, in which successive time periods called frames are each divided into successive time slots. Each time slot is allocated to, for example, traffic information, paging information and/or broadcast information such that each frame comprises traffic time slots, paging time slots and/or broadcast time slots. In some TDMA systems, paging and broadcast information can be sub-multiplexed in one time slot, and the other time slots can carry traffic information. Each paging time slot includes paging information identifying which mobile station is being paged. Further details of such communication systems are available in the literature and are specified in the standards TIA/EIA/IS-95-A and TIA/EIA/IS-136, among others, that are promulgated by the Telecommunications Industry Association (TIA) and the Electronic Industries Association (EIA). Such systems are also described in U.S. Pat. No. 5,539,748 to Raith; and in U.S. patent application Ser. No. 08/768,976 filed on the same date as this application and entitled "Reduced Power Sleep Modes" by Dent et al.; among others.

FIG. 1 shows two successive TDMA frames XX, YY, each of which comprises 128 time slots sequentially numbered 1–128, that might be used in the exemplary digital radio communication system described above. Each time slot contains data symbols D, which for the purposes of this application may be considered arbitrary, and predetermined synchronization symbols S, as illustrated by the partial exploded view of time slot 6 of frame XX. In an exemplary communication system, the digital symbols D and S are modulated on a radio-frequency carrier signal at a bit-rate of approximately 1.625 megabits per second (Mb/s), preferably using $\pi/4$ quadrature phase shift keying ($\pi/4$-QPSK), and each frame is twenty milliseconds (20 ms) long. Thus, each frame includes 16250 quaternary symbol periods (data or sync), and each quaternary symbol represents two bits of information according to which of four signal vectors is transmitted (1, j, −1, or −j for even-numbered symbols and $\pm 1 \pm j$ for odd-numbered symbols). The total number of information bits carried by each such TDMA frame is therefore 32500.

In the exemplary communication system, the 16250 symbol periods in a frame are divided into 128 time slots of 124 symbol periods each. Except for the last and first slots of successive frames, the members of each pair of successive time slots are separated by two symbol periods that are used for changing transmitter power levels between time slots; the last and first time slots are separated by 124 symbol periods. It will be appreciated that the extra long separations (124 symbol periods) can occur between any two time slots and that a frame's total of 378 symbol periods used for separating time slots can be distributed in other ways, for example to effect different relative slot timings. Nevertheless, corresponding time slots in successive frames should always occur at regular intervals of 20 ms, or 16250 symbols. TDMA communication systems currently in use generally have regularly spaced timeslots, but the above-described exemplary system is not so restricted and is therefore more general.

A mobile station operating in a TDMA communication system must synchronize itself in time and frequency with a paging slot or channel in order determine whether it is being paged. This has usually been done by having the mobile station first identify a paging time slot using a coarsely accurate timing and then correlate symbols received in the paging time slot with known synchronization symbols transmitted in the paging time slot to obtain fine timing accuracy. Paging time slots are often identifiable because they are transmitted (and, hopefully, received) at a higher average power level than other time slots. The mobile station identifies a paging time slot in a frame by identifying the time slot having the highest energy level and then achieves time-synchronization by correlating the known sync symbols with the sync symbols received in the paging time slot.

In the European digital cellular system known as GSM, base stations transmit an unmodulated TDMA burst to give receivers coarse sync and another TDMA burst that contains a long pattern of known bits to allow receivers to obtain fine sync. Having obtained coarse and then fine sync, a GSM receiver transitions to listening to yet another type of TDMA slot containing paging information. The GSM system is representative of the functions that must be performed to enable a mobile phone to obtain synchronization on power up, but GSM has limitations when applied to a satellite communications system. In particular, a satellite system may not be able to transmit an unmodulated burst to provide coarse sync.

Before time-synchronization can be achieved, a receiver must also "synchronize" itself to the frequency of the signal it is trying to receive. A TDMA frame to be transmitted by an earth-orbiting satellite may be modulated on a carrier signal having a frequency typically in the range 1.6 gigahertz (GHz) to 2.5 GHz, and the modulated carrier may be received by a terrestrial fixed, mobile, or hand-held receiver having a limited frequency accuracy. It will be appreciated that the frequency accuracy of a small, battery-powered, hand-held radio receiver is typically about ±5 parts per million (ppm) when the receiver is free-running, i.e., before the receiver detects the carrier signal, determines its relative frequency error, and corrects it. (This process is known as initial acquisition.) Thus, the frequency error during acquisition is ±5 ppm×2.5 GHz, or ±12.5 KHz (kilohertz). It is advantageous therefore to choose wideband TDMA waveforms, such as postulated for the exemplary system, in order that this frequency error be small in relation to the receiver bandwidth, thus facilitating initial acquisition.

The receiver amplifies and filters the collected signal energy, digitizes selected portions, and carries out further processing of the digitized portions, for the purpose of time synchronization for example. As described in U.S. Pat. No. 5,048,059 to Dent, digitization can advantageously be carried out using a logpolar technique, in which signals related to instantaneous amplitude and to instantaneous phase are digitized. The signals related to instantaneous phase, for example, can represent the cosine and sine of the phase angle, respectively, and the signals related to instantaneous amplitude can be proportional to the logarithm of the instantaneous radio signal strength indication (RSSI) signal that is well known in mobile communication systems. U.S.

Pat. No. 5,048,059 is expressly incorporated in this application by reference.

The exemplary radio communication system disclosed in U.S. patent application Ser. No. 07/967,027, filed on Oct. 27, 1992, entitled "Multi-Mode Signal Processing" by Dent et al. includes a dual mode FDMA/TDMA mobile phone that obtains time and frequency synchronization, and that patent application is expressly incorporated here by reference. To achieve frequency synchronization, a method of correlating sync symbols having undetermined frequency errors with phase-twisted sync symbols, where the phase twists correspond to different, respective frequency errors, is described in Swedish Patent No. 459 137 to Raith, which is also expressly incorporated here by reference.

Achieving time synchronization (and frequency synchronization, for that matter) is more difficult when the ratio of the signal power to the noise power (SNR) is low. One problem with satellite communication systems is that the large distances between transmitters and receivers result in low SNRs, oftentimes even less than unity. Due to the low SNR of the received signal, it is difficult to identify accurately, in a single-shot manner, the time slot having the highest energy level in a frame; a traffic time slot may be improperly identified, rather than a paging time slot. Accordingly, simple-mindedly identifying the highest-energy time slot as a paging time slot can result in errors in satellite and other communication systems operating at low SNR.

A more reliable method would comprise averaging the slot energy over several frames. Unfortunately, at very low SNR the necessary averaging time may be long, such that significant timing drift would occur during the averaging period. Thus, an average of energy in slot 5 at the start of the averaging period may drift to become corrupted by energy from slots 4 or 6 at the end of the averaging period. "Dynamic programming" is a technique that has been applied successfully in automatic voice recognition devices, which involve sampling speech signals. In such devices, dynamic programming is used to choose a time warping that maximizes sums of correlations (or minimizes mismatches) between a sequence of spoken words and digitally stored examples, or templates. Since words can be spoken at various rates that typically differ from the rates of the stored templates, dynamic programming is used to determine which samples of a spoken word shall be correlated with which samples of a template along a curve of "warped time" so as to compensate for rate differences.

Besides the field of voice recognition, a dynamic programming algorithm has been used by Applicant to synchronize a receiver to frequencies of low-SNR, narrowband, frequency-hopping satellite signals that were subject to unknown frequency errors by simultaneously testing postulates of hop frequency and frequency error. Using a fast Fourier transform (FFT) processor, a plurality of parallel receivers tuned to different hypothesized frequencies were created simultaneously, and energies from corresponding bins of successive FFTs were accumulated based on knowledge of the hopping pattern. Some aspects of this system are described in U.S. Pat. No. 4,476,566 to Dent.

Prior methods and apparatus did not address reception of wideband signals at low SNR, including the problem of synchronization with a TDMA signal containing a regular succession of known bit patterns that are separated from one another by uncertain time periods. Accordingly, systems and methods are needed for locating and time synchronizing with time slots received with low SNR, even as low as −10 dB.

SUMMARY

Applicant's invention permits a communication terminal such as a hand-held telephone quickly to identify a desired carrier signal or time slot of a carrier signal and to synchronize itself in time and frequency to that carrier or slot. The desired carrier or slot may be that to which the communication station should listen when the station is in an idle mode. Synchronization is achieved even when frequency and time reference signals in the communication station are offset, e.g., due to drift, with respect to the carrier signal or slot by averaging successions of signal measurements that occur at times when corresponding signal values are expected. In this way, the SNR of the average received carrier signal or slot is enhanced compared to a single-shot measurement.

In accordance with one aspect of the invention, a method of achieving time synchronization with a wideband signal received at low SNR includes the step of averaging together a plurality of measurements of the received signal taken at a group of predetermined time points where corresponding values are expected, in order to enhance the signal to noise ratio. The averaging step is carried out several times using different groups of time points, the groups corresponding to respective, different expected clock frequency errors. The results of the averaging steps are used in determining a best hypothesis for the received signal frequency and timing.

The invention allows a mobile station such as a hand-held cellular phone to identify quickly an optimum frequency or time slot to which it should listen to while idle, and thus to obtain frequency and time synchronization with a received signal. This is achieved even when frequency and time references in the mobile station have errors relative to the received signal.

The invention preferably uses a method known as dynamic programming to test synchronization hypotheses based on different hypotheses of timing drift rate and to discriminate between different hypotheses of timing and timing drift rate in order to maximize a sum of correlations or energy accumulations.

In one particular aspect of the invention, a receiver obtains time synchronization with a predetermined portion of a signal broadcast by a transmitter at predetermined repetition intervals by sampling the signal and storing samples at respective locations in a memory. The memory locations are identified by respective addresses, and a postulate of addresses of memory locations in which samples corresponding to a first occurrence of the predetermined portion are likely to have been stored is selected. The method continues with the step of determining a succession of measurement values related to the predetermined portion from the samples stored in the memory locations identified by the postulate of addresses, and a first measurement value is determined from samples that begin at a starting address and the successive measurement values are determined by incrementing the starting address until all samples stored at the postulate of addresses have been used. The succession of measurement values is stored in memory locations having sequential addresses.

The method continues with the step of additively combining a selected one of the measurement values stored in memory locations having a first group of sequential addresses with measurement values stored in memory locations having a second group of addresses. The first group of addresses corresponds to measurement values determined from a first likely occurrence of the predetermined portion and the second group of addresses corresponds to measurement values determined from a subsequent likely occurrence of the predetermined portion, and the addresses in the first group are separated from the addresses in the second group by amounts corresponding to the repetition interval and in a range from the repetition interval less an uncertainty in the interval to the repetition interval plus the uncertainty in the interval. An optimal one of the combined values is determined, thereby obtaining time synchronization with the predetermined portion of the broadcast signal.

The measurement values can be signal strength values or correlation values determined by correlating samples with a known signal pattern. The known signal pattern may be a digital code, and the digital code may be one of a set of orthogonal digital codes. Also, the measurement values can be determined by correlating samples with every digital code in the set of orthogonal digital codes, and a Fast Walsh Transform can be used for correlating samples with every digital code in the set of orthogonal digital codes. The step of additively combining can include combining moduli of the measurement values.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

This invention seeks to determine a TDMA paging slot or any slot that includes a sequence of symbols having characteristics (e.g., that the symbol sequence is one of a set of orthogonal codes) known a priori to the receiver. In the case of paging, several paging slots are usually contained in each TDMA frame, and these may advantageously be transmitted, e.g., by a satellite, in different directions with the aid of an electronically steered antenna, as described for example in allowed U.S. patent application Ser. No. 08/179,953 filed on Jan. 11, 1994, entitled "Cellular/Satellite Communication System with Improved Frequency Re-Use" by Dent. This allowed application is hereby incorporated by reference in this application.

Figure 1:
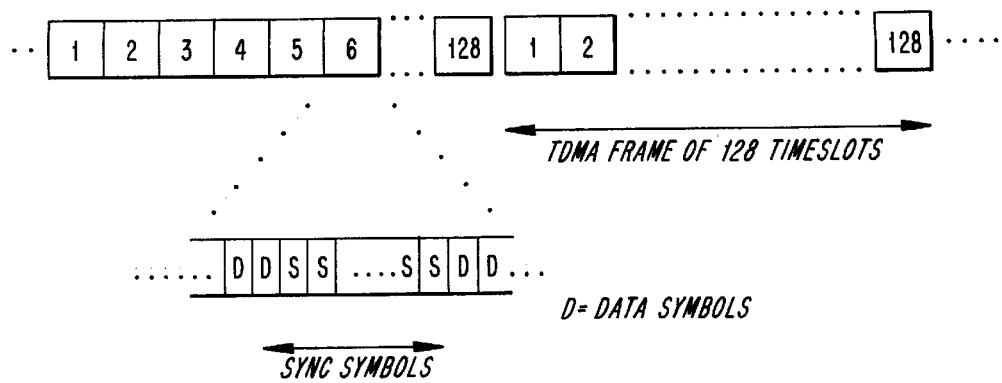
FIG. 1 illustrates an exemplary TDMA transmission format, including successive frames, each comprising a succession of time slots.

For example, 128-slot TDMA signal frames such as those illustrated in FIG. 1 might allocate slot numbers 16, 32, 48, 64, 80, 96, 112, and 128 for paging. These paging slots may be transmitted at a modestly higher power level than the other, traffic carrying, slots use on average. In addition, one of these eight paging slots may be transmitted at a greatly higher power, for example 10 dB higher, than the other seven. It is advantageous to stagger the higher power slots in time between different carriers and different directional beams radiated from the satellite transponder. In particular, the one slot per frame transmitted at greatly higher power should not coincide with a similar slot on any other carrier or beam. Using the exemplary format, 128 non-overlapping timing positions for the highest power slot are available, thus allowing one occurrence per frame in each of the 128 beams. If more than 128 beams or carriers are required to occasionally radiate the greatly higher power burst, the power of one of the eight paging slots may be increased less often according to a systematic superframe structure known in advance to the terrestrial receivers. Moreover, the paging slot that is greatly increased in power does not always have to be the same slot but can vary according to an agreed, possibly pseudorandom, pattern, such as 48, 128, 32, 16, 96 . . . , always respecting the desirability of avoiding simultaneous transmission of a plurality of high power slots from the same satellite transponder. The receiver can test for the occurrence of the highest power slot according to the agreed pattern and thus obtain coarse sync with the longer superframe structure at the same time as obtaining frame synchronization.

In accordance with Applicant's invention, the first part of a method of achieving time synchronization is a coarse sync search, by which desired slots transmitted on at least one carrier signal are located by energy accumulation. After the receiver is tuned to a likely carrier frequency, an RSSI signal is averaged over corresponding time slots in a plurality of successive frames; the averaged RSSI signal is sampled; and the samples from the plurality of successive frames are stored in a memory. To compensate for offsets due to errors in the receiver's frequency and time reference signals and to possible Doppler shifts of the carrier signal, several sets of samples are generated based on several different hypotheses of time spacing corresponding to different selections of the corresponding time slots and the "best hypothesis" is determined.

The energy over a postulated slot position in the received signal may be computed by averaging or summing RSSI values over the postulated slot window, using a sliding rectangular window or moving average technique. Alternatively, RSSI values may be applied to the input of a low-pass filter having a time constant of about one slot duration, and then the output of the filter would be sampled. Using either smoothing method, computing smoothed RSSI values at intervals of two samples per slot period guarantees that at least one of the two samples will be no more than one-quarter slot period away from the mid-slot position, where the average energy should be maximal.

Depending on the complexity of the processing used in different implementations of the invention, energy averages may be computed for all possible positions in the frame for the sync or paging slot, during every frame period, and then energy averages of corresponding slots in successive frames are accumulated to improve identification of the desired slot. Alternatively, processing may be reduced by testing only one hypothesis of the desired slot position at a time, so that energy measurements of only one slot per frame need be computed. The latter method will take longer to identify the desired slot, which is the price of reducing complexity.

When energy averages for corresponding slots in successive frames are summed, the summed measurements are not necessarily taken exactly a whole number of slots apart, if the frame length is not exactly a multiple of the slot length, as in the exemplary system. Corresponding slots are however one frame apart, or exactly 16250 symbol periods in the exemplary system, which is four symbol periods short of 129 slot periods of the 124 symbols plus two guard symbols each. Thus the timing of the RSSI averaging window, or the sampling of the output of an RSSI smoothing filter, must be advanced by four symbol periods in total over each frame period. It is not significant whether this timing adjustment is made one symbol period at a time at four approximately equispaced intervals over the frame or whether an adjustment of four symbol periods is made at a single position per frame. One might draw an analogy with having a leap day on February 29 every four years, or alternatively four leap days of February 29, 30, 31, and 32 every 16 years, which would not have any great impact. Using either method for keeping track of corresponding slots in successive frames, 129 possible positions for the desired slot are tested at half-slot intervals, yielding 258 results per frame.

Figure 10B:
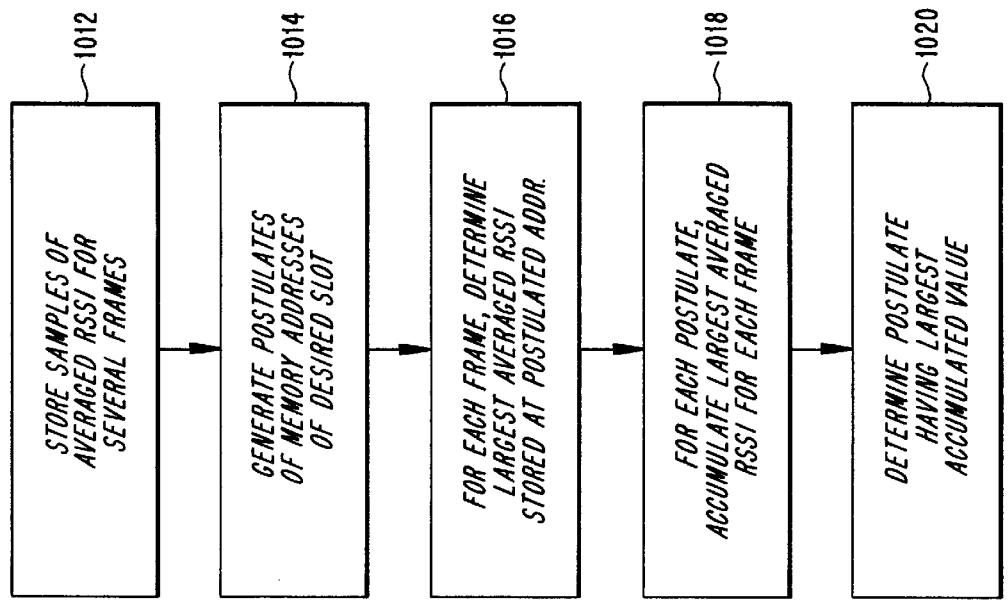
FIGS. 10A, 10B, 10C, and 10D are flow charts of coarse synchronization processes.
Figure 10A:
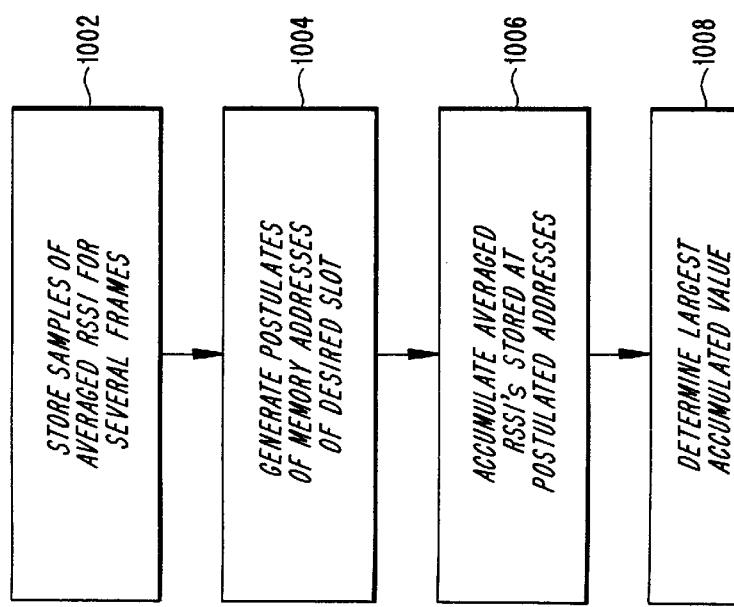

In accordance with the invention, a plurality of samples of the averaged RSSI signal of a plurality of frames are obtained in this way, as illustrated by step 1002 in FIG. 10A. In the exemplary system just described, eight successive frames are sampled and 8×258 averaged RSSI samples are obtained, all of which may be stored in respective, separately addressable locations in a convenient buffer memory. The desired slots may then be identified by manipulating the samples as described below with respect to FIGS. 2A, 2B, and 10A.

As a first step (step 1004 in FIG. 10A), it is postulated that certain samples were collected from the desired slots, such as paging slots, which should exhibit a higher average energy. In the example given above, one might postulate that the first sample of every sampled frame was collected from a paging slot, as well as succeeding samples 33, 65, 97, . . . , 225 of that frame; for this postulate, which may be called postulate 1 (see FIG. 2A), samples 1, 33, 65, . . . , 225 of the next frame, and of the next frame, and so on for eight frames are also collected from paging slots.

Having collected eight frames of data in a memory, that data is retrospectively processed to attempt to identify the paging slots. In an implementation having eight regularly spaced paging slots occurring in slots 1, 17, 33, . . . , 113, or in terms of the numbering 1–256 of half-slot spaced energy measurement windows, sample numbers 1, 33, 65, . . . , 225, eight samples spaced thirty-two samples apart are accumulated, starting with a postulate of a memory address for the sample that corresponds to the first paging slot of a frame. Then, a 34-sample gap to the first paging slot of the next frame occurs in the exemplary system due to the assumed guard time between frames. Allowing for the 34-sample gap, the eight samples corresponding to paging slots in the next frame are then accumulated, and so on until energy measurements have been accumulated across all of the stored data samples. This is repeated for all 258 postulates of the memory address of the starting sample number, yielding 258 accumulations as illustrated by step 1006 in FIG. 10A. The largest of these indicates the most likely position of the first paging slot in the frame (step 1008 in FIG. 10A).

In the above method, it will be realized that the presence of the slight timing irregularity caused by the inter-frame guard time helps avoid the 8-fold ambiguity when eight paging slots are regularly placed in the frame, as an incorrect postulate of the frame starting position will result in the 34-sample jump to the corresponding sample of a following frame to be made at the wrong place, thus missing one or more paging slots and giving lower accumulated energy.

The reduction of ambiguity may be helped, in a general implementation of the invention, by using a deliberate irregularity in the paging slot spacing, such as 1, 16, 34, 40, 59, 63, 81, . . . Knowing the spacing at the receiver, energy in received slots spaced by the known amount is accumulated as above, but with lower likelihood of accumulating large values when an incorrect postulate of the position of the first slot is made. The irregular slot spacing should be chosen such that a shifted version of the slot pattern gives minimum slot coincidences between the shifted and the unshifted slot patterns.

In a second implementation illustrated in FIG. 10B, where it is known a priori that one of the eight paging slots is greatly increased in power, a postulate of the position of the first paging slot in the sample buffer is made as before, but then the largest of the eight samples corresponding to the eight paging slots is determined. The largest of the eight samples in each of the other seven stored frames is then determined using the same timing postulate and with due regard for frame-to-frame spacing of corresponding slots. This is illustrated by step 1016 in FIG. 10B, steps 1012 and 1014 being substantially the same as steps 1002 and 1004, respectively, in FIG. 10A. The largest values from each of the eight frames are then added to provide an indication of the likelihood of the timing postulate used (step 1018 in FIG. 10B). The indication is computed for every possible timing postulate, and the postulate giving the highest likelihood indication is selected as the coarse time synchronization position (step 1020 in FIG. 10B).

The function of determining the largest of each set of averaged RSSI samples (step 1016 in FIG. 10B) can be performed by a wide variety of comparator devices 201, 202, . . . , 208. For example, the maximum search circuit described in U.S. Pat. No. 5,187,675 to Dent et al. is one suitable device. It will be appreciated that the largest of each set of samples, as well as the other steps described in this application, can also be determined by a suitably programmed data processor.

Figure 2A:
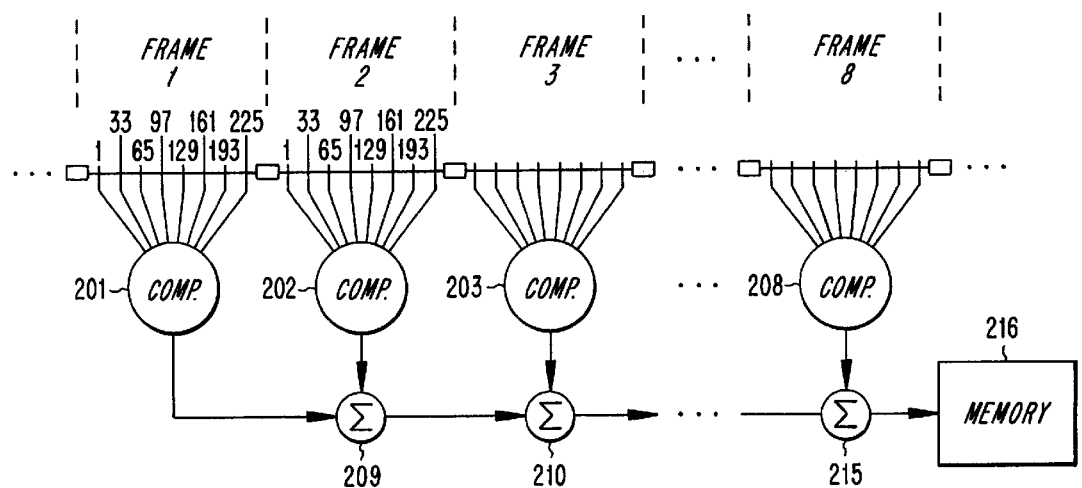
FIGS. 2A, 2B illustrate a coarse sync method of determining the timing of desired time slots.
Figure 2B:
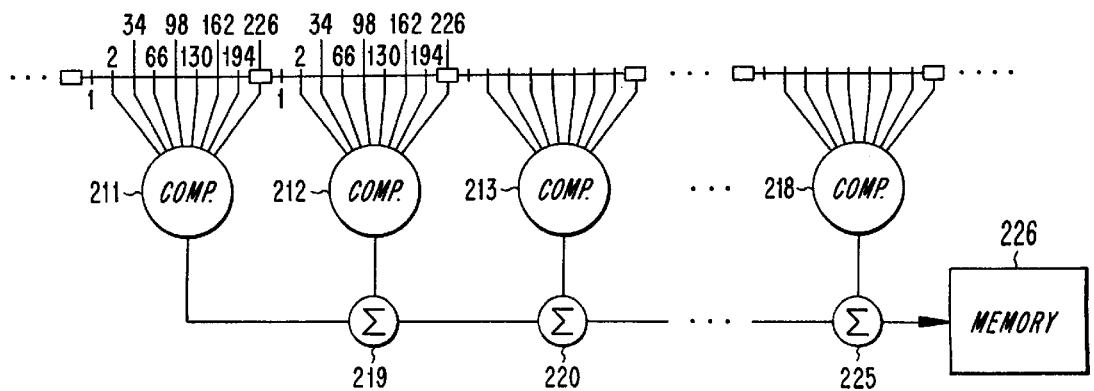

The next step is to add together each of the largest samples for each of the eight frames and store the sum against postulate 1. This step 1018 in FIG. 10B is carried out by the adders 209, 210, . . . , 215 and the memory 216 illustrated in FIG. 2A. In FIGS. 2A, 2B, the guard symbols between frames are indicated by the solid blocks on the slot time lines.

These steps are repeated with another postulate, call it postulate 2, that has a timing offset with respect to postulate 1. For example, postulate 2 may assume that the second sample is the first desired slot, and thus the largest of samples 2, 34, 66, . . . , 226 of each sampled frame is identified by respective ones of comparators 211, 212, . . . , 218 and summed by adders 219, 220, . . . , 225, to produce a sum that is stored in memory 226 against postulate 2, as illustrated in FIG. 2B.

In accordance with the invention, these steps are repeated for every possible postulate, i.e., that each of the samples may be the desired slot. In this way, 258 sums are produced for the exemplary frame format described above that are stored against their respective postulates, as illustrated by step 1018 in FIG 10B. The largest of these 258 sums indicates which of the sample timing postulates best corresponds to a paging slot hypothesis, or other desired slot hypothesis identified by maximal averaged RSSI signal values. See step 1020 in FIG. 10B.

It will be appreciated that it is possible to distinguish the incorrect hypothesis that slot 33 is slot 1 when slot 1 is the true slot 1 by observing from FIG. 2B that one occasion on which slot 1 was transmitted at high power is omitted from a largest value comparison, with the result that the overall sum will have a lower value.

Figure 3:
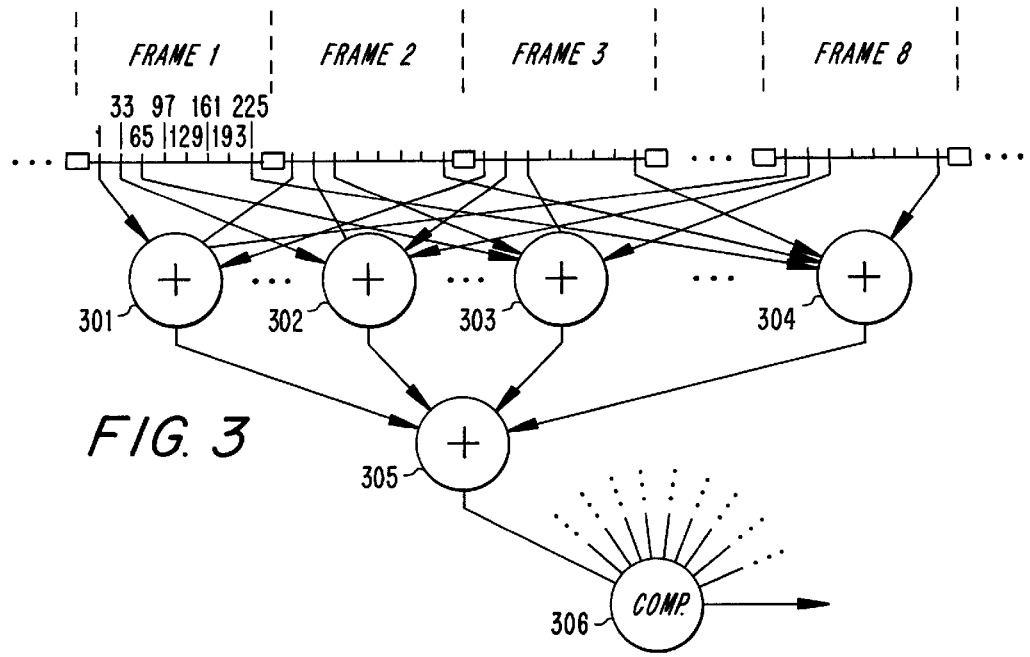
FIG. 3 illustrates an alternative coarse sync method.

Rather than attempt to determine the slot having the largest RSSI sample by the steps described above, the following alternative method of determining a desired slot merely depends on highest-RSSI-sample slots being separated by a fixed, known number of symbol periods (e.g., 16250, the number of symbols in a frame). This alternative method is illustrated in FIGS. 3 and 10C.

A first RSSI sample is obtained from a slot (call it slot 1) in frame 1; this first sample is added to a second RSSI sample (also presumably from slot 1) from frame 2; this sum is added to a third RSSI sample (also presumably from slot 1) from frame 3; and this continues until a sum of eight RSSI samples is produced by a summer 301 and stored. This eight-value sum corresponds to a postulate (call it postulate 1) that the so-called slot 1 is the desired slot, e.g., a paging slot. In a similar way, sums of eight RSSI samples are produced and stored for each of the other possible postulates (257 in this example), as illustrated by step 1024 in FIG. 10C. Step 1022 in FIG. 10C is substantially similar to step 1002 in FIG. 10A. In FIG. 3, only summers 302–304 for postulates 33, 65, and 225 are shown for clarity and convenience.

Eight of these sums which are thirty-two samples (frames) apart are then added together, starting at the sum for postulate 1, i.e., that the so-called slot 1 is the desired slot. This step of forming a sum of sums, which is illustrated in FIG. 10C by step 1026 and in FIG. 3 as being carried out by a suitable summer 305 for postulates 1, 33, 65, 97, 129, 161, 193, and 225, is repeated for the sum for postulate 2 and the other seven postulates that are thirty-two samples apart, then for the sum for postulate 3 and the other seven postulates that are thirty-two samples apart, and so forth up to the sum for postulate 32 and the other seven postulates that are thirty-two samples apart. In this way, thirty-two sums-of-sums are generated, the values of which are then compared by a suitable comparator 306.

Figure 10D:
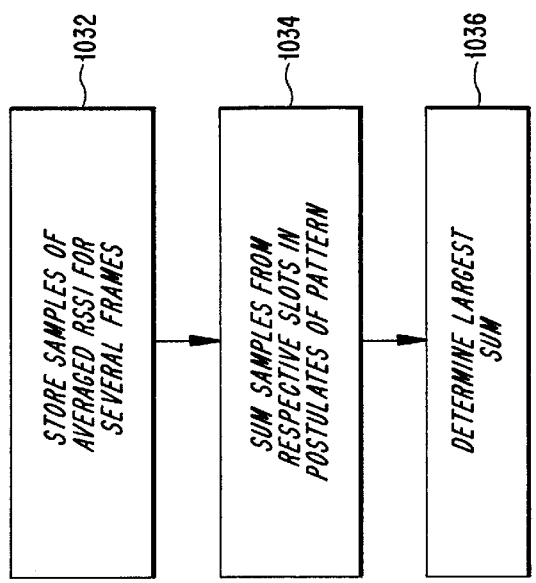
Figure 10C:
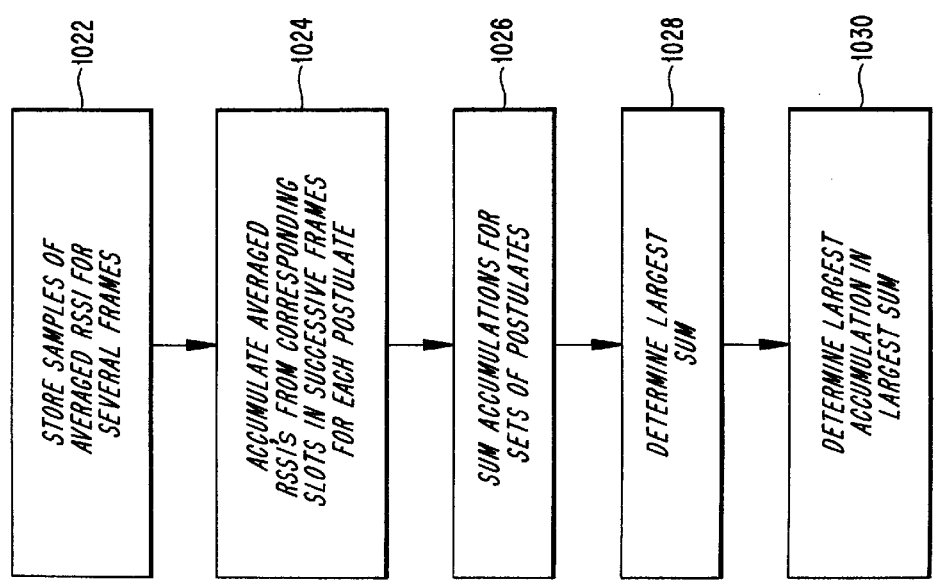

The largest of the sums-of-sums determined by the comparator 306 indicates the locations of the desired slot (step 1028 in FIG. 10C). For example, suppose the largest sum-of-sums is that which includes the sum of the eight samples for postulate 18. Therefore, that largest sum-of-sums indicates that one of the postulates 18, 40, 72, 104, 136, 168, 200, and 232 corresponds to the desired slot. The largest of the eight postulates contributing to the largest sum-of-sums is determined by comparing the sums for those eight postulates, as illustrated by step 1030 in FIG. 10C.

When it is necessary or desirable to test several carrier signals in order to identify the carrier that illuminates the receiver with the strongest signal, the above-described processes can simply be repeated for each candidate carrier. It is believed these processes can be repeated for up to sixteen candidates without excessively delaying the receiver's initial sync process, which is performed after first switching on the receiver. An acceptable time period to complete initial sync can be a few seconds. Also, these processes may be performed upon the receiver's detecting that the carrier signal it is listening to is weakening and no alternative stronger signal can be found. In that case, it is acceptable if it takes tens of seconds to lock to a new carrier signal.

By carrying out one of the above-described coarse sync procedures illustrated in FIGS. 10A, 10B, and 10C, the slot having the highest received signal strength in the mean is provisionally identified. In many communication systems, this slot will be a paging slot. There is a finite probability, however, that a traffic slot will be incorrectly identified as a paging slot; this possibility will be screened out as described in more detail below.

It may be desirable to determine the number of the paging slot identified by the coarse sync procedure. In a system in which there generally are not significant transmitted signal strength variations between eight different paging slots, a difference in received signal strength can be dominated by transmitting one out of those eight slots at a relatively higher power. If the position of that higher power slot is varied cyclically according to a known pattern, such as slot 1, slot 3, slot 2, slot 8, slot 5, slot 7, slot 6, slot 4, slot 1 . . . , then synchronization to this pattern may be obtained as follows, which is illustrated in FIG. 10D.

Assuming that the numbering of the slots identified by the coarse sync search has been correctly deduced and that slot 1 is transmitted at higher power in the first frame, then according to the exemplary pattern given above, slot 3 should be the higher power slot in the second frame, slot 2 should be the higher power slot in the third frame, and so on. In accordance with the invention, a dynamic programming algorithm is used to identify the pattern as follows.

Figure 4:
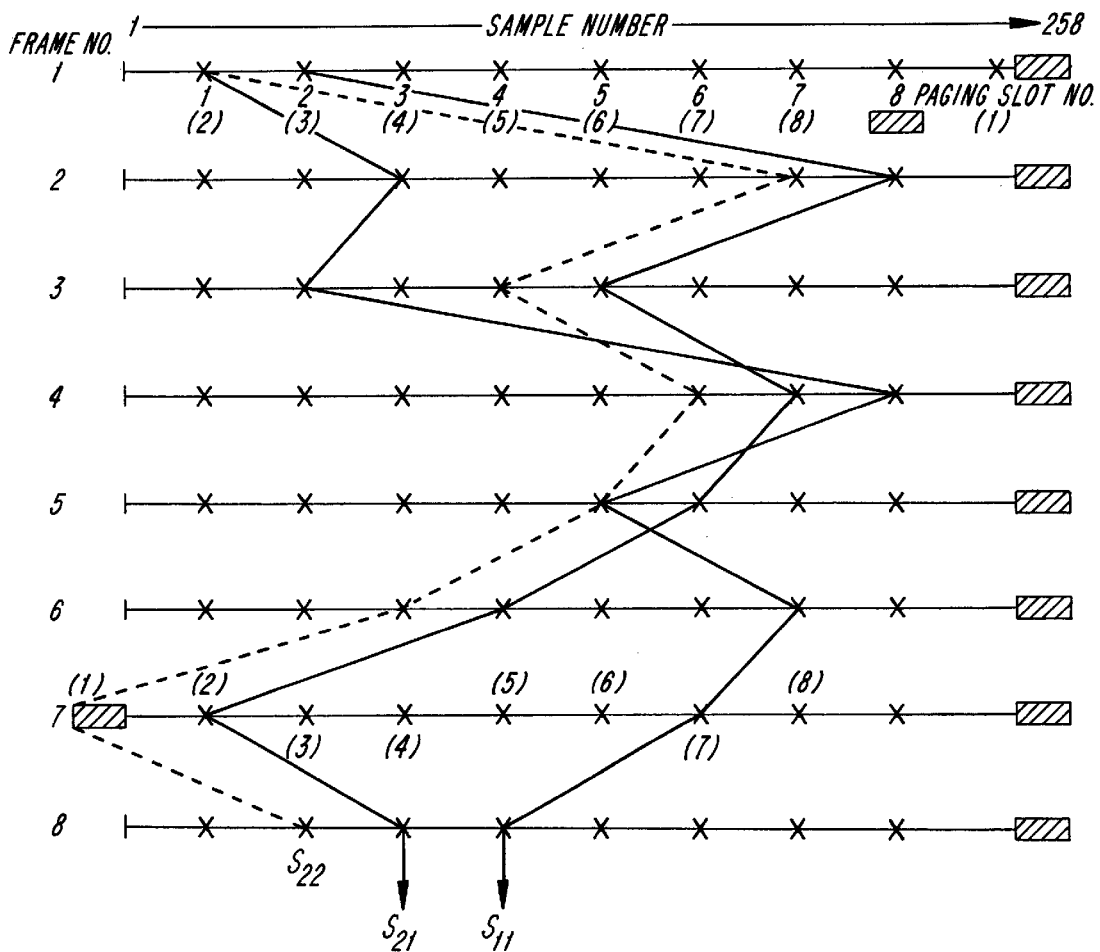
FIG. 4 illustrates a process for synchronizing to a pattern of slots.

As in FIGS. 10A, 10B, and 10C, samples of the averaged RSSI signal are stored (FIG. 10D, step 1032). The sampled RSSI signal is summed along a line passing through the slots in the expected pattern, i.e., slots 1, 3, 2, 8 . . . , in successive frames as indicated by the grid in FIG. 4 and step 1034 in FIG. 10D, yielding a result $S_{11}$. In FIG. 4, the eight frames are depicted in a vertical arrangement with their slots aligned, with the sample number (ranging from 1 to 258 in this example) indicated across the top of the figure and the frame number indicated along the side. A second postulate that paging slot 2 was the higher power slot in the first frame is tested by summing the sampled RSSI signal along a different solid line as shown in FIG. 4, yielding a sum $S_{21}$. It will be appreciated that the "lines" through the grid along which the sampled RSSI signal is summed are determined by the expected pattern in the cyclically varying position of the higher power slot. Testing all possible postulates yields eight measurement values $S_{11}, S_{21}, S_{31}, \ldots, S_{81}$, which are stored in respective, separately addressable locations in a suitable memory.

It is then further postulated that the slot identified as slot 1 in frame 1 was mis-identified and that that slot was actually slot 2. Accordingly, slot 2 was actually slot 3; slot 3 was actually slot 4; and so on, as indicated by the numbers in parentheses in FIG. 4. If this further postulate is in fact correct, then the value $S_{21}$ was based on a sample taken in a guard time between frames, where the power was almost certainly not higher than the powers in paging and traffic slots and may even have been zero. The postulate that slot 2 in frame 1 had a higher power is tested by adding to it the sampled RSSI signal in slot 8 in frame 2, which should also have had a higher power, the sampled RSSI signal in slot 5 in frame 3, and so on, resulting in a value $S_{22}$. In general, the notation $S_{ij}$ refers to the result of testing the postulate that slot 1 in frame 1 was actually the desired slot j, and that slot i of frame 1 was sent at higher power.

In this example, the sixty-four values $S_{ij}$ thus are a subset of all possible paths through the grid, which number $8^8$, and the largest $S_{ij}$ (see step 1036 in FIG. 10D) indicates both the desired slot numbering and the pattern timing. It can be noted that all the above-described timing tests can be performed by fast numerical processing after signal sampling, without waiting for further frames to be sampled. In the case of an inconclusive result, which is indicated by a largest value of $S_{ij}$ having little difference from the next largest value, further frames can be sampled at two samples per slot and the testing by summing along lines through the grid continued until RSSI values accumulated along some line(s) clearly show an optimum timing.

By carrying out one of the above-described coarse sync procedures, slot timing is coarsely established and a highest power slot identified with high probability. A process of more finely determining the proper timing, called fine sync, is needed so that the receiver can ultimately demodulate and decode the information in that slot. To achieve fine sync, the RSSI signal of the highest power slot determined by the coarse sync process is sampled in a further eight successive frames at a relatively high sampling rate, e.g., eight samples per symbol, which in some systems corresponds to 6.5 megahertz (MHz). This is illustrated by step 1102 in FIG. 11A. While this high sampling rate might appear to present problems in data handling capacity, it should be recognized that after sampling each slot, substantially a whole frame time (e.g., 20 ms) is available for processing, or reducing, the raw samples. Thus, a buffer memory used for capturing the samples in respective, separately addressable locations can be re-used for the samples from each slot.

Figure 11B:
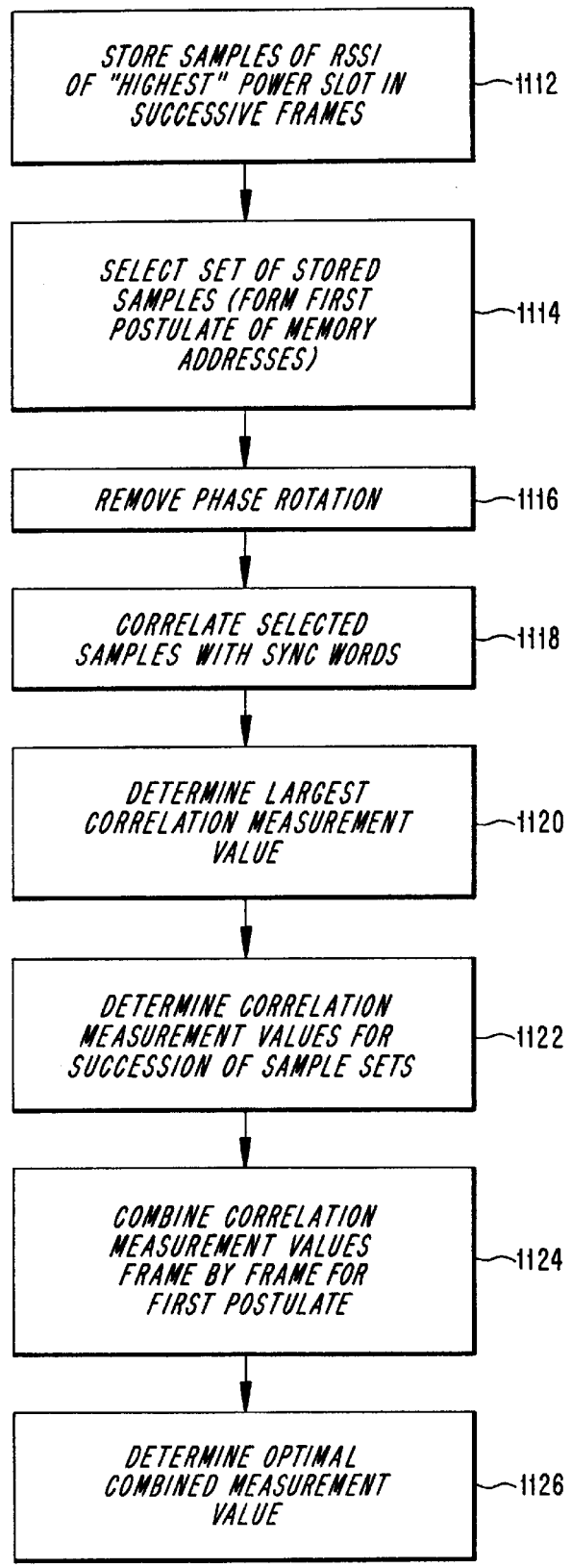

Reduction of the captured samples is accomplished by correlating the captured samples with known symbols contained in the slot, as illustrated by step 1104. For example, an eight-symbol sync pattern, or sync word, may be chosen from a set of orthogonal patterns that remain orthogonal under arbitrary phase rotations. Different orthogonal patterns may be allocated to respective paging slots to assist in confirming slot identities. Correlation with many or all possible slot sync words may be performed efficiently if desired with the aid of a Fast Walsh Transform. As an alternative, however, a single sync word known to be associated with the slot number determined by the coarse sync process can be correlated with the captured samples, as described below in connection with FIG. 11B.

Figures 9A, 9B, 11A:
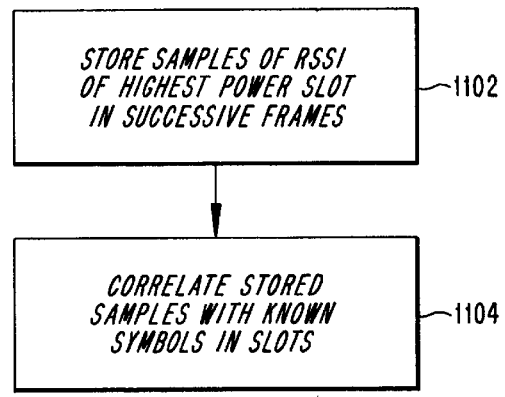
FIGS. 9A, 9B illustrate burst, or slot, formats.
FIGS. 11A, 11B are flow charts of fine synchronization processes.

First, a set of eight samples spaced by one symbol period (i.e., one out of every eight samples) is selected from the sample buffer (step 1114), in which RSSI samples are stored (step 1112 in FIG. 11B) in the same manner as step 1102 in FIG. 11A. The set starts at sample $k_0$, and the index 0 is used below to identify this first timing hypothesis, or postulate, of the start of the sync word. As an optional next step 1116, any progressive rotation between odd and even symbols, as a result of a modulation such as π/4-QPSK, can be removed, thereby facilitating subsequent calculations. For example, a progressive 45 degree (π/4) phase rotation may be applied to successive samples such that a 0 degree rotation is applied to sample $k_0$, a −45 degree rotation is applied to sample $k_{0+8}$, a −90 degree rotation is applied to sample $k_{0+16}$, etc. The transmitter's allocation of symbols to data-bit pairs (i.e., each symbol comprises two data bits in some well known modulation schemes, such as π/4-QPSK) can take account of this progressive rotation by the receiver such that the rotated samples correctly represent the desired data-bit pairs. The result of the progressive rotation is that the real parts of the eight samples in a set are either the same or have inverted signs with respect to each other, and the imaginary parts likewise, where the eight-symbol sync pattern is one of the following eight-bit Walsh codewords:

| | | | | | | | |
|---|---|---|---|---|---|---|---|
| 1 | 1 | 1 | 1 | 1 | 1 | 1 | 1 |
| 1 | −1 | 1 | −1 | 1 | −1 | 1 | −1 |
| 1 | 1 | −1 | −1 | 1 | 1 | −1 | −1 |
| 1 | 1 | 1 | 1 | −1 | −1 | −1 | −1 |
| 1 | −1 | 1 | −1 | −1 | −1 | −1 | 1 |
| 1 | −1 | −1 | 1 | 1 | −1 | −1 | 1 |
| 1 | 1 | −1 | −1 | −1 | −1 | 1 | 1 |
| 1 | −1 | −1 | 1 | −1 | 1 | 1 | −1 |

As noted above, the selected samples stored in the memory locations identified by the postulate of addresses are correlated with the known symbol, as illustrated by step 1118. In this example, the eight correlations of the set of eight samples against the above-listed possible Walsh sync words may be performed by carrying out a complex fast Walsh transform, which yields eight complex correlation values that are preferably converted to magnitudes or magnitudes-squared to remove the arbitrary signal phase. The largest of these correlation values is retained as a correlation measurement value $K_0$ for the 0-th timing hypothesis, as illustrated in step 1120.

If known Walsh codewords are not used, the following method of correlating a set of samples with an arbitrary, known sync word (step 1118) can be employed. As a first step, the sample $k_0$ is rotated counter-clock-wise by a predetermined phase angle that was applied by the transmitter's modulator for sync symbol 1. For example, if the sync symbol 1 sent by the transmitter was −1+j (i.e., a phase angle of 135 degrees), then the sample $k_0$ is rotated backwards through 135 degrees. This is done by multiplying sample $k_0$ by −1−j, which is the conjugate of the sync symbol sent. This phase rotation step is carried out in a similar way for the seven subsequent samples $k_{0+8}$, $k_{0+16}$, . . . in the set, e.g., the sample $k_{0+8}$ is rotated backwards by the predetermined phase angle of sync symbol 2, and so on. The expected result of these phase rotations is alignment of the rotated vectors, which are then summed, and the magnitude or squared magnitude of the resultant vector is the correlation measurement value $K_0$ that is computed and stored against the 0-th sync timing postulate (step 1120). The magnitude or squared magnitude will be large if the postulate of sync word and sync position is correct and will be small otherwise.

Steps 1114 through 1120 are repeated (step 1122) for successive sets of samples that start, for example, ¼ of a slot period earlier than the position determined by the coarse sync process and end ¼ of a slot later than that position. This embodiment would thus encompass, in total, ±32 symbol periods or ±256 samples $k_i$, and would produce 512 real correlation measurement values $K_i$ from the original approximately 1024 complex values. Processing eight frames in this way would produce 4096 correlation measurement values for each postulate of the sync word. The number of correlation measurement values can be reduced by combining the 512 values produced for a frame with the values produced for a previous frame or frames (step 1024 in FIG. 11B) according to a dynamic programming method that is described below, yielding a new set of 512 combined correlation measurement values. The optimal combined measurement value is then determined (step 1126), generally by determining the largest combined measurement value.

Were it not for inherent inaccuracy in the clock controlling the sampling of the received symbols at eight times the symbol rate, it would be a simple matter to accumulate the resultant magnitude for a sync position hypothesis with the corresponding hypothesis from the next frame (step 1124). For example, the 512 correlation measurement values derived from frame 1 would just be added in a 1:1 fashion to corresponding ones of the 512 correlation values from frame 2, and these sums would be added in a 1:1 fashion to the 512 correlation values derived from frame 3, and so forth.

The duration of an eight frame accumulation, however, is typically so long that inaccuracies in the sampling clock preclude this simple approach. In the exemplary system, the eight frames have a duration of 160 ms, and a typical hand-held mobile radiotelephone's reference crystal oscillator may be in error by ±0.8 $\mu$s over this duration. (The accuracy of such oscillators is typically ±5 ppm.) Such an oscillator would drift by ±0.7 $\mu$s (i.e., ±4.5 samples) during the 140 ms between nominally corresponding correlation values derived from the first and eighth frames, which is a drift just greater than ±0.5 samples per 20 ms frame. Simple accumulation of the correlation values (step 1124) is thus not usually advisable, but Applicant's dynamic programming process can accumulate the proper corresponding values.

Figure 12:
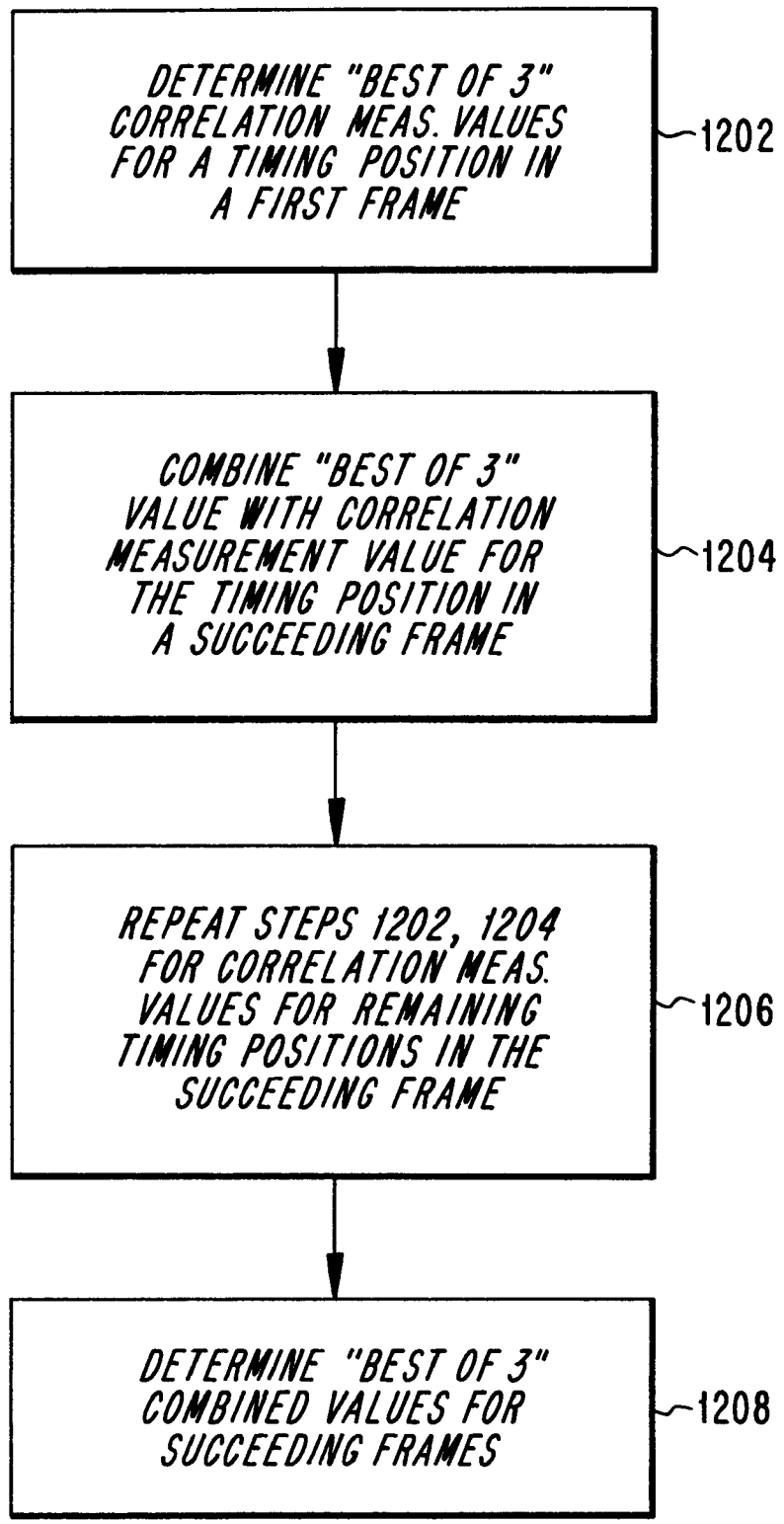
FIG. 12 is a flow chart of a dynamic programming process used in fine synchronization.

In one embodiment, Applicant's method of carrying out step 1124 permits a timing drift of up to ±1 sample per frame (e.g., per 20 ms). With such a drift, the correlation measurement value $K_{0+i}$ derived from frame 2 for a timing position 0+i should correspond to one of the correlation measurement values $K_{+i-1}$, $K_{0+i}$, or $K_{0+i+1}$ derived from frame 1. In accordance with the invention, the "best of three" of these, i.e., that frame 1 correlation measurement value within ±1 of a given position having the largest magnitude, is selected by a device such as a comparator 501. This is illustrated by step 1202 in FIG. 12. This "best of three" value is added by a summer 502 to the correlation measurement value $K_{0+i}$ of frame 2, as illustrated by step 1204. In a similar way, this select-and-add process is carried out for all correlation measurement values derived from frame 2 by letting the index i range from 0 to 511 (step 1206). It will be noted that there are only two rather than three available precursors (correlation measurement values derived from frame 1) to the first and last frame 2 correlation measurement values, $K_1$, $K_{511}$, respectively. In this way, 512 combined correlation values for frame 2 replace the original 512 correlation measurement values derived from frame 1. Only the 512 combined values accumulated in this way need be retained from frame to frame.

In an optional enhancement of this process, a frame 2 correlation measurement value can be replaced by its sum with a "best of three" frame 1 correlation measurement value just after it is calculated, thereby eliminating the need to store the 512 correlation measurement values derived from frame 2. This would reduce the buffer memory size needed by a digital signal processor that would typically be used to perform these calculations and would reduce power consumption and cost.

Figure 5:
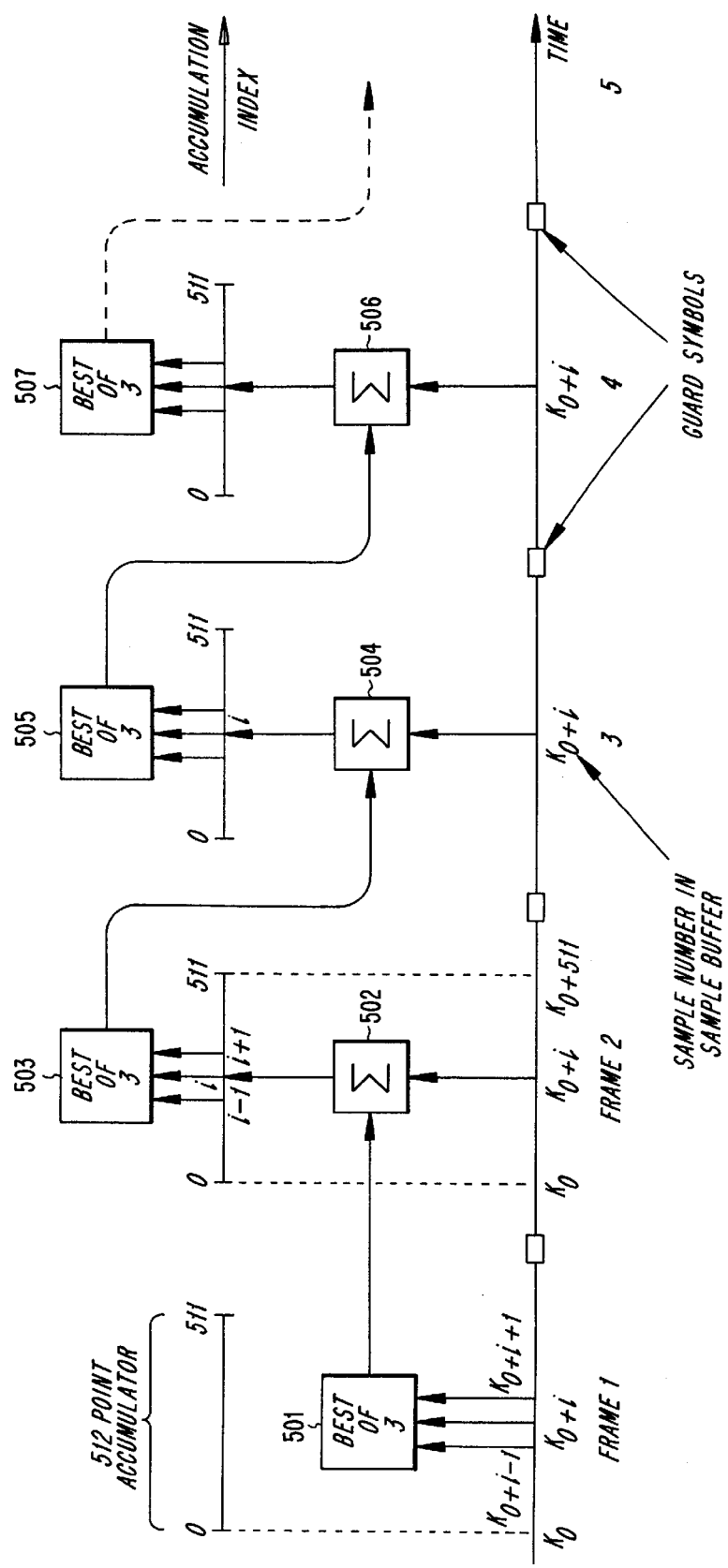
FIG. 5 illustrates the accumulation of correlation values in successive frames that accounts for timing drift by a dynamic programming process in accordance with one aspect of Applicant's invention.

When frame 3 samples are produced and the correlation values computed, the same procedure is used adding a frame 3 correlation value to the "best of three" previous accumulations to obtain an array of three-frame combined correlation values. This is illustrated by step 1208 in FIG. 12. As indicated in FIG. 5, the best (largest magnitude) of each triplet of cumulative correlation values for frame 2 produced by the summer 502 is selected by a device 503 and is added by a summer 504 to the corresponding correlation value $K_{0+i}$ of frame 3. In this way, 512 cumulative correlation values for frame 3 replace the original 512 cumulative correlation values for frame 2. As noted above, a frame 3 correlation measurement value can be replaced by its sum with a "best of three" two-frame cumulative correlation value just after it is calculated, thereby eliminating the need to store the 512 correlation measurement values derived from frame 3. Only the three-frame cumulative values need be retained to compute the four-frame cumulative values, and so on.

This process (step 1208) is repeated for the remaining frames, which in the embodiment illustrated in FIG. 5 are frames 4–8 (only frames 4 and 5 are indicated explicitly in the figure). Since at each stage the "best of three" previous cumulative correlation values is selected (e.g., by devices 505, 507 for frames 3 and 4, respectively) and carried forward to be added to a new correlation measurement value (e.g., by summer 506 for frame 4), the accumulation is insensitive to drift up to the order of ±1 sample per frame, which in this embodiment corresponds to a frequency error of just less than 10 ppm.

Figure 6:
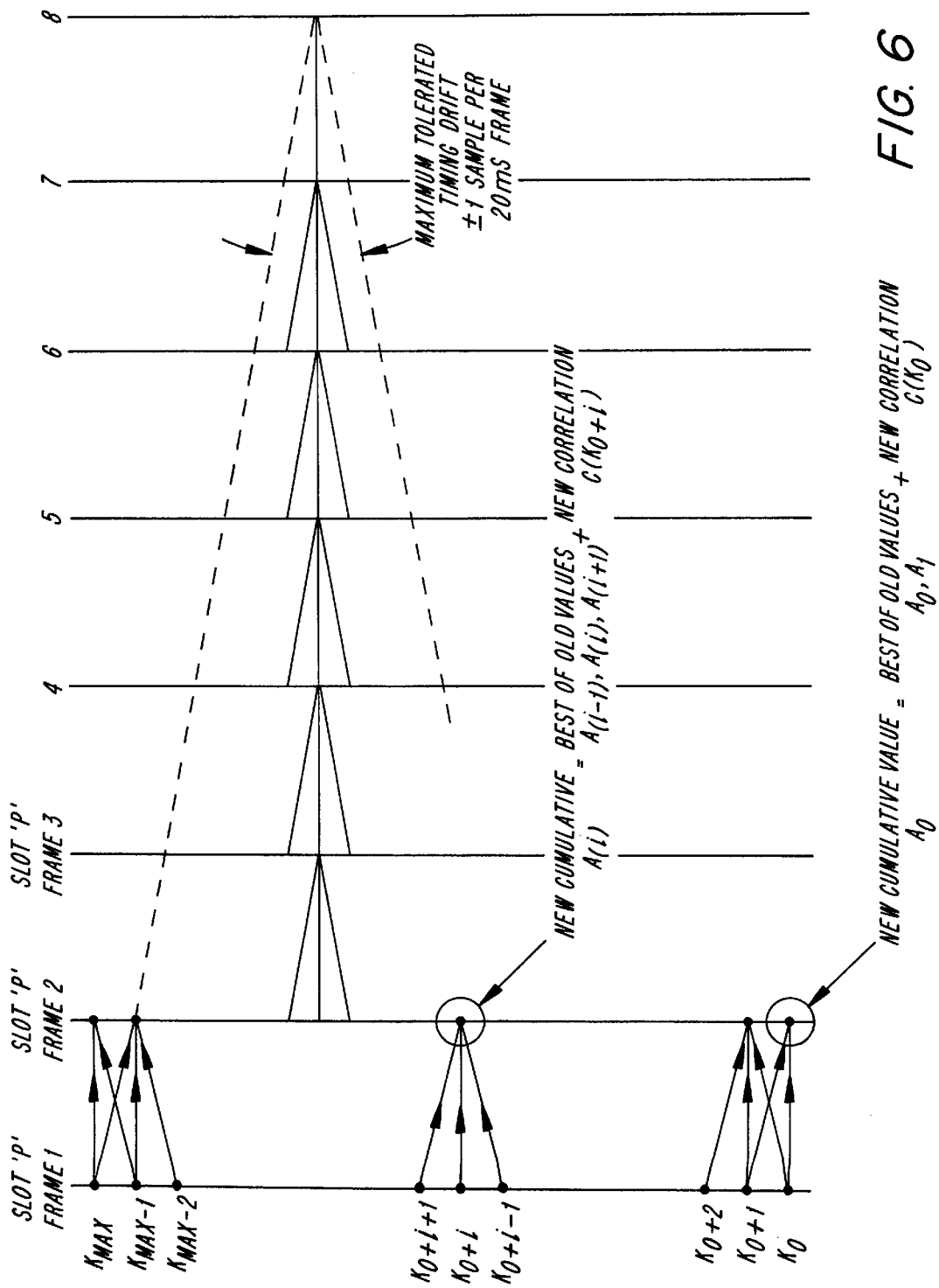
FIG. 6 is an alternative depiction of the dynamic programming process of accumulating corresponding correlation values in successive frames that compensates for timing drift that is illustrated in FIG. 5.

FIG. 6 is an alternative depiction of the dynamic programming process of accumulating corresponding correlation values in successive frames while compensating for timing drift that has just been described in connection with FIG. 5. Eight frames are indicated by the vertical lines in the figure, and correlation values $K_0$, $K_{0+i}$, ..., $K_{0+i-1}$, $K_{0+i}$, $K_{0+i+1}$, ..., $K_{MAX-1}$, $K_{MAX}$ derived from frame 1 are disposed along the line for frame 1. From FIG. 6, it can be seen how each cumulative correlation value for frame 2 is derived by selecting the "best" of the three corresponding frame 1 correlation measurement values and adding the corresponding correlation measurement value for frame 2.

In some communication systems, it may be possible to ensure that the sampling clock has a drift rate that is less than ±0.5 sample per frame, for example by providing more precise crystal oscillators. In such systems, an alternative to the dynamic programming process illustrated by FIGS. 5 and 6 can be employed. This alternative process, which is illustrated by FIGS. 7A, 7B, allows a drift of ±1 sample over two frames, and thus this alternative method requires storage of correlation values or cumulative correlation values derived from two previous frames.

Figure 7B:
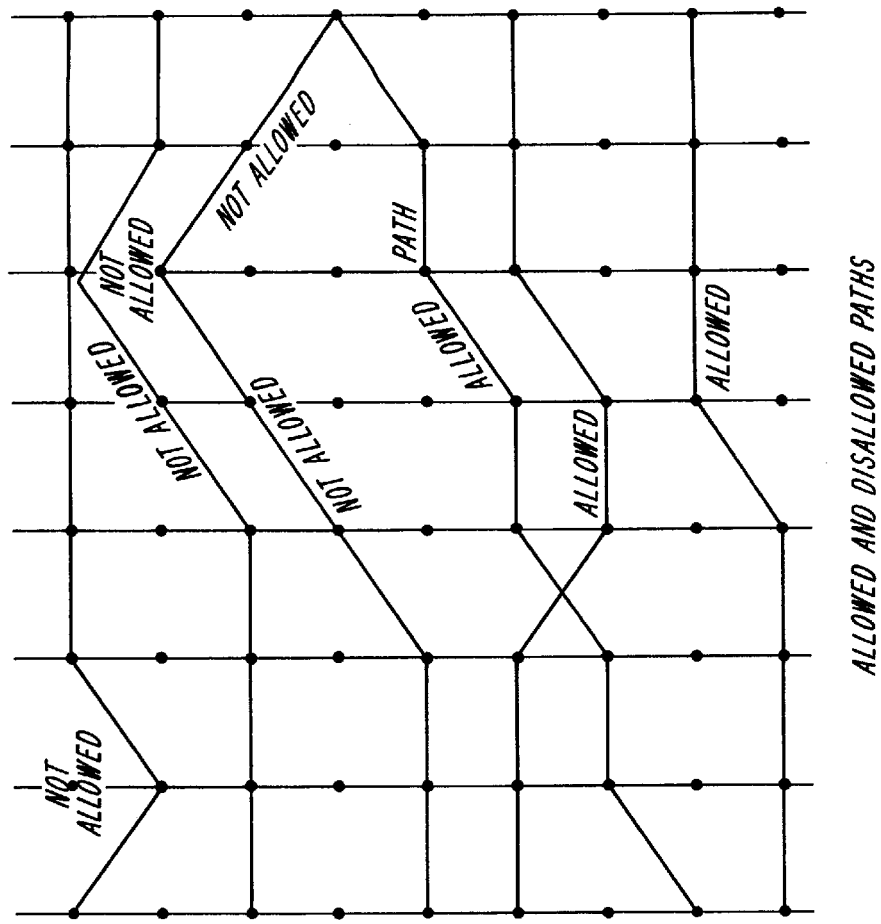
FIGS. 7A, 7B illustrate another process for accumulating corresponding correlations and compensation for timing drifts.
Figure 7A:
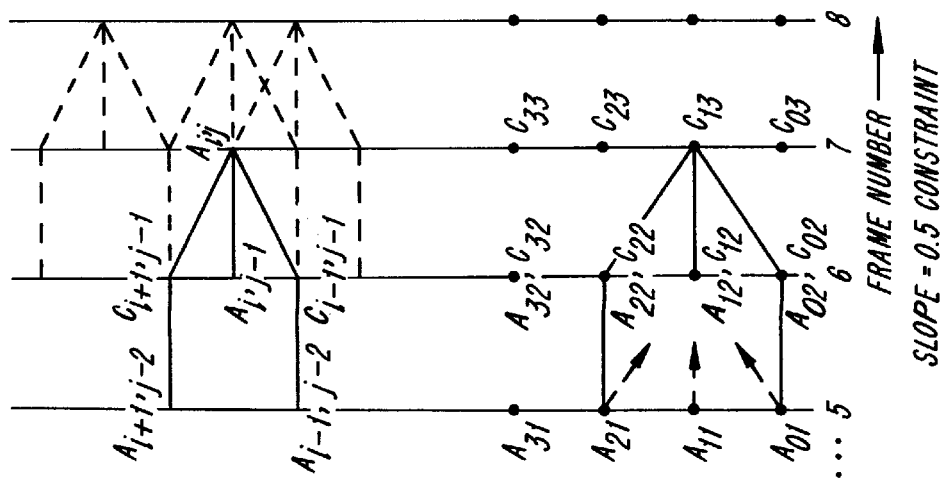

In FIGS. 7A, 7B, a correlation value derived by correlating samples with the i-th sync timing shift in frame j are denoted by $C_{i,j}$, and cumulative correlation values are denoted by $A_{i,j}$. Each $A_{i,j}$ is formed by selecting the best one of allowed predecessors $A_{i-1,j-1}$; $A_{i,j-1}$; and $A_{i+1,j-1}$, but selection of $A_{i-1,j-1}$ is permitted only if the predecessor of $A_{i-1,j-1}$ is $A_{i-1,j-2}$ and not $A_{i-2,j-2}$ because the latter implies a timing drift of two samples in two frames. To constrain the allowed drift rate to one sample per two frames, the only predecessors to $A_{i,j}$ that are used are $A_{i-1,j-2}+C_{i-1,j-1}$; $A_{i,j-1}$; or $A_{i+1,j-2}+C_{i+1,j-1}$. Since $A_{i,j-1}$ propagates horizontally to $A_{i,j}$, it is not necessary to limit its allowed predecessors, and thus allowance of the dotted path in FIG. 7A is implicit. The benefit of Applicant's dynamic programming process having slope constrained to ±0.5 sample per frame as compared to Applicant's process having slope constrained to ±1 sample per frame is that the optimum path, i.e., the path that has the largest cumulative correlation value after processing all of the frames, will stand out more sharply from the rest.

It is also desirable to carry forward traceback information that enables the drift over the total frame period to be established after the greatest cumulative correlation value is determined. This is accomplished by attaching to, or associating with, each cumulative correlation value a net count of the number of times the preceding path selected predecessor j−1, j, or j+1. The net count associated with a selected predecessor is decremented if the selected predecessor was candidate j+1 to become the count of the current frame. The count of a predecessor j−1 is likewise incremented if selected, and the count of predecessor j is left unchanged if selected and becomes the count associated with the successor.

The net count, which for the embodiment depicted in FIGS. 7A, 7B will have a value between +4 and −4 samples drift over the 140 ms total frame period, allows the sampling clock's frequency error to be determined to within ±1 ppm accuracy. This can be used by a receiver initially to correct its crystal oscillator before a more accurate correction might be made.

With greater clock accuracies or lower bit rates or lower signal sample frequencies, a one-sample drift may occur only over several frame periods. It may still be necessary, however, to accumulate correlations over such a long period that several samples of drift occur in the accumulation period. A long accumulation period can be needed when, for example, it is desired to obtain time synchronization at lower signal-to-noise ratio.

In an extension of the above-described dynamic programming principles, data from a plurality of previous frames can be retained, e.g., eight frames are retained if a slope constraint of one sample drift in eight frames is to be applied. A simpler method is, however, to accumulate frames of data in blocks of frames over which no significant drift occurs by just adding corresponding values without the use of dynamic programming. For example if a drift of less than one sample in eight frames is expected, eight-frame correlations are obtained. Having condensed the data by 8:1 in this way, the eight-frame correlations may be accumulated using dynamic programming to account for up to ±1 sample of drift between successive eight-frame cumulative correlations.

Such a more accurate frequency correction may be made by demodulating the data in one or more slots and using the demodulated data to determine the receiver position as described in U.S. patent application Ser. No. 08/179,958 filed on Jan. 11, 1994, entitled "Position Registration for Cellular Satellite Communication Systems" by Dent et al. and/or the downlink Doppler frequency shift as described in U.S. patent application Ser. No. 08/305,784 filed on Sep. 14, 1994, entitled "Frequency Error Correction in a Satellite-Mobile Communications System" by Dent. Both of these patent applications are expressly incorporated here by reference. Indeed, a correction for the downlink Doppler shift may be made before the crystal oscillator is corrected so that the oscillator produces a correct absolute frequency. Such Doppler drift that is not compensated by modifying the frequency of the crystal oscillator may instead be compensated by controlling the sampling clock that determines the instants at which slots are sampled. The timing generator may be programmed to sample succeeding slots slightly earlier or slightly later to compensate for the Doppler drift. Using this mechanism, frequency errors determined will be more due to crystal oscillator errors and less due to Doppler shift errors.

Techniques for separating an oscillator-error part from a Doppler-error part in conjunction with performing a position estimate of a satellite communication receiver have been known since deployment of the first satellite navigation systems, i.e., TRANSIT. Systems and methods in accordance with Applicant's invention may include a TRANSIT-type navigation solution in order continuously to produce updates for correcting the crystal oscillator and the slot sampling clock, making use of satellite orbit or position information broadcast periodically on one or more of the slots.

Applicant's dynamic programming process can also be extended to accomplish parallel processing of several postulates for the slot sync word, thereby facilitating correct identification of the desired slot. If a different slot sync word yields a higher cumulative correlation value, then that value is considered more reliable than the result of the coarse sync process, i.e., the identification based on received signal strength.

Potential erroneous identification, such as a false identification of a traffic slot as a paging slot, can be prevented by a further extension of the method in accordance with Applicant's invention. In this extension, the sync words used in the desired (paging) slots are also allocated cyclically to the other (traffic) slots. Thus, no one traffic channel (in general, a succession of traffic slots) can produce a high cumulative correlation value with a single sync word. A systematic variation of sync word usage on traffic slots has been disclosed in the applications incorporated by reference above as being useful in another context, i.e., estimating a carrier to interference (C/I) ratio from neighboring antenna beams in which the same carrier frequency and time slot is re-used. The use of orthogonal sync words in corresponding time slots of other beams can eliminate interference at least with the slot synchronization process, which is also used to obtain phase references for coherent demodulation and further can permit the amount and phase of interference from adjacent beams to be measured and reported to the communication system for use in refining its transmit antenna array processing coefficients. This receiver-assisted transmit antenna array processing is disclosed in the above-cited allowed U.S. patent application Ser. No. 08/179,953, which was incorporated by reference above.

It is also advantageous to incorporate systematic (patterned) sync word cycling on paging slots. If the pattern is known, correlations can be made with the expected sync word, but the unavoidable timing uncertainty during initial sync means that the sync word pattern phase is temporarily unknown. As a result, all possibilities must be tested by the synchronization processes described above.

To avoid excessive complexity, it can be advantageous to select a cyclic sync word pattern that has a repetition period that is the same as the repetition period of the cyclic higher-power pattern. Moreover, all slots transmitted at higher power can be arranged always to use the same sync word, so that the process depicted in FIG. 4 for tracking the higher power slots can in principle be extended to track correlation values derived from that single sync word instead of just RSSI values. The process of FIG. 4 must, however, be extended to include a dynamic programming process to account for the timing drift rate.

Figure 8:
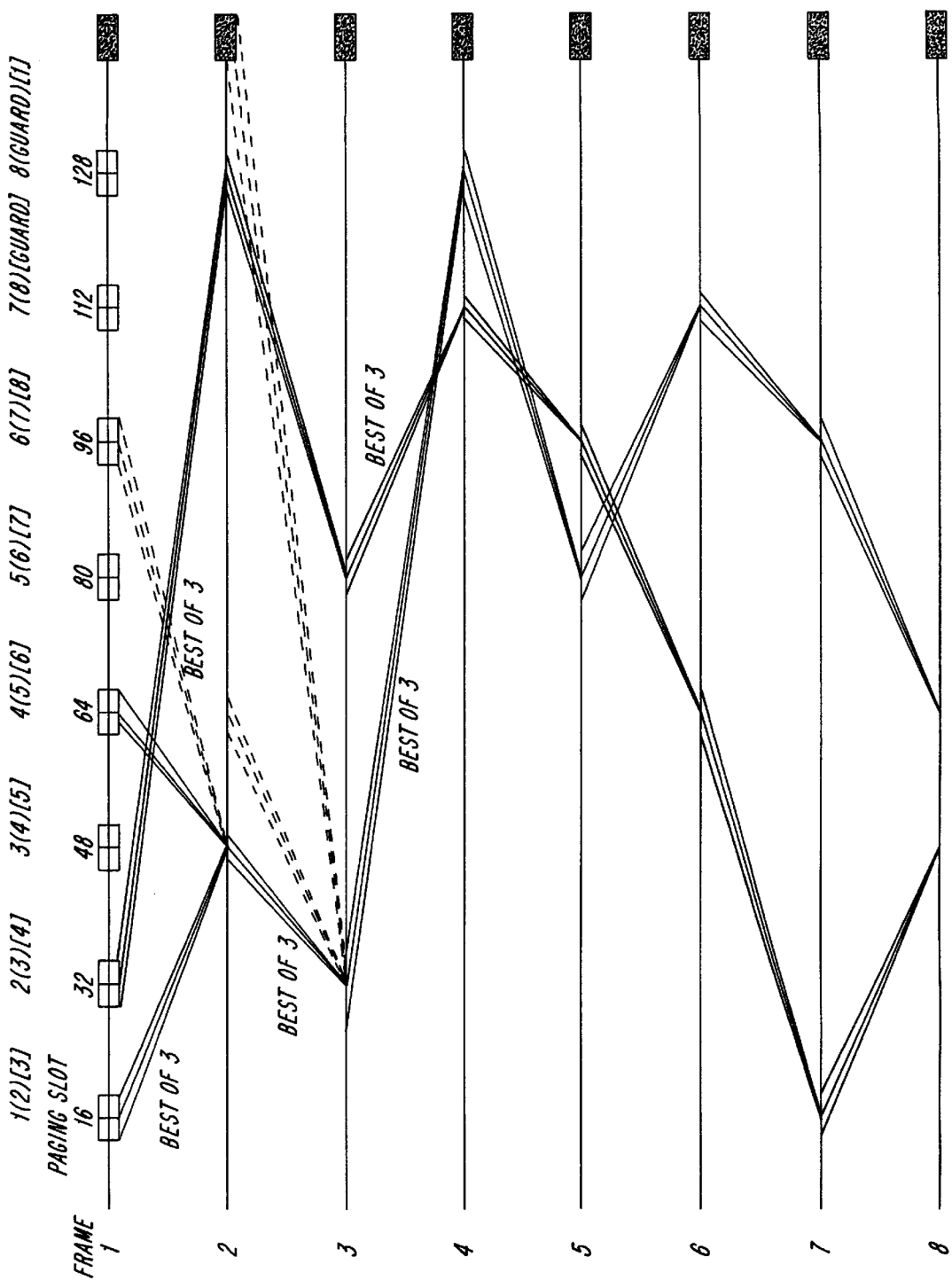
FIG. 8 illustrates tracking of cyclically permuted words.

This is illustrated by FIG. 8, which depicts a set of correlations, performed on each of eight candidate paging slots from frame 1, with a sync word known to be used when the paging slot is transmitted at higher power. One such pattern has higher power and the given sync word in slot 1, slot 3, slot 2, slot 8, slot 5, slot 7, slot 6, slot 4, slot 1, slot 3, etc. in successive frames. The correlation values are available for many sample shifts in, for example, ⅛-th-symbol-period steps from −32 to +32 symbol periods about the nominal slot center. Thus, the number of correlation values stored for frame 1 is 8×64×16=8192.

A similar number of correlation values is calculated for frame 2. If the postulate that slot 1 (shown on the left of frame 1 in FIG. 8) is indeed paging slot 1 and is transmitting higher power now, then slot 3 will have higher power and the known sync word in frame 2. Thus, corresponding correlation values from slot 2 of frame 1 and slot 3 of frame 2 are accumulated. In doing so, account is taken of the maximum expected timing drift rate by accumulating the "best of three" correlation values for frame 1 with a corresponding correlation value for frame 2. This best-of-three process is the dynamic programming process described above.

Likewise, the postulate that slot 2 of frame 1 is indeed slot 2 and currently at higher power is tested. In that case, the "best of three" neighboring correlation values will accumulate in slot 8 in frame 2 if the higher power/ given sync word slot pattern is as described above. When eight frames have been accumulated, 16×512 cumulative correlation values will have been calculated, and the largest of these will be the best of the tested postulates.

In addition, however, the postulate that slot 1 of frame 1 is mis-identified and is really slot (2) has to be tested. (Sets of alternative slot numbers are enclosed by parentheses and square brackets.) Thus, if slot 3 in frame 2 is really slot (4) having higher power and a given sync word, it would have been preceded by slot (5) in frame 1 having higher power and a given sync word. Likewise, if slot 3 in frame 2 is really slot [5], its corresponding predecessor in frame 1 is slot [8], and so on. Thus, a further 16×512 cumulative correlation values are generated for each such postulate, and the best of these is determined.

Eight such best cumulative correlation values are finally compared to determine both the fine sync timing, the slot identification, and the phase of the cyclic higher power/ given sync word pattern. The amount of memory needed for carrying out this process can be reduced by determining the fine sync timing first, whereby the range of timing uncertainty over which sync must be searched is reduced from ±32 symbols×8 samples/symbol over the eight frames to ±1 symbol×8 samples/symbol over those frames.

To enhance understanding of Applicant's invention, another embodiment is described below.

Let an exemplary TDMA communication system comprise a satellite or other base station transceiver that transmits signals organized in a succession of frames, each frame having sixteen slots. The sixteen slots may contain traffic (e.g., digitized speech) intended for respective ones of sixteen different mobile stations, or two mobile stations may share the same slot, just alternating frames. The latter arrangement allows thirty-two mobile stations to share the 16-slot frames and has a frame length, as seen by a mobile, of thirty-two slots.

In yet another arrangement, one slot of each frame may be dedicated to broadcasting information to many mobile stations. For example, slot 1 of every frame may be used for broadcasting a calling channel, or paging channel, i.e., a channel to which idle mobiles (i.e., mobiles not currently engaged in calls) listen. This channel is sometimes called a broadcast control channel (BCCH).

A succession of these first slots can have a BCCH sub-multiplex pattern. It is known from the European GSM digital cellular communication standard that it can be advantageous to have the periodicity of the BCCH sub-multiplex pattern be mutually prime with respect to the periodicity of the traffic channels. For example, a traffic channel format may involve successive groups of fifty-two successive frames, in which one slot of every thirteen slots out of each succession of fifty-two slots is used to transmit slow associated control channel (SACCH) information and the other forty-eight slots of each succession are used to transmit traffic, e.g., speech. This pattern repeats every fifty-two slots. The BCCH information transmitted in slot 1 of each frame, however, is formatted (sub-multiplexed) with a period of fifty-one slots.

In this GSM-style signal structure, the slot duration is approximately 570 $\mu$s, giving each 16-slot frame a duration of approximately 9.1 ms and the BCCH 51-frame format a repetition period of approximately 470 ms.

By determining the timing of the traffic channel format and the timing of the BCCH format, a mobile station can determine the timing of a system clock over a period of 51×52 frames. Other information may be broadcast to provide even more slowly changing digits of the system clock, thereby increasing the total period beyond 51×52 frames. Such long clocks are useful for cipher synchronization, as disclosed in U.S. Pat. No. 5,148,485 to Dent, which is expressly incorporated here by reference.

Within such a 51-frame BCCH sub-multiplex format, the different slots may be used for different purposes. In GSM, five of the fifty-one slots are used for transmitting an unmodulated carrier (called the "frequency correction burst", or FCH), which the mobile may detect using a narrowband filter to yield coarse timing and frequency error estimation; a further five slots of the fifty-one slots are used for transmitting a burst having only a known sync pattern (long sync word) and transmitter identification information.

Such bursts may be transmitted at higher power than other BCCH bursts, which in turn may be transmitted at higher power than the average of traffic-carrying bursts. Such higher power bursts may be identified by the above-described power-profile method in accordance with Applicant's invention in order to obtain coarse synchronization with the BCCH format and thereby identify the BCCH channel. Fine synchronization may then be established by practicing other aspects of the current invention described above.

As described above, the coarse sync process according to Applicant's invention comprises computing average signal strengths over a sliding window or using a smoothing time-constant of the order of the slot period (as opposed to Applicant's fine sync process that uses symbol period increments), and then accumulating the slot signal strength for the same slot in corresponding positions in successive BCCH sub-multiplex periods in order to obtain 51×16=816 results (if one value per slot window is accumulated) or 4×816=3264 results (if four signal strength samples per slot period are taken at quarter-slot intervals, as is currently preferred and assumed below).

After accumulating each new slot-signal-strength value, the hypothesis that it corresponds to the first higher-power slot transmitted in the BCCH format is tested. For example, if the higher-power slots are known to be slots 1, 12, 24, and 37, the value in bin i (the current bin out of the 4×816 bins), the value in bin (i+4×11), the value in bin (i+4×23), and the value in bin (i+4×36) are summed. The sum is compared with the maximum value previously obtained, and if the current sum is larger, the current sum becomes the new maximum. The bin associated with the current maximum value is at any time the current best estimate of which timing bin corresponds to BCCH frame 1.

It may be noted that the spacing of higher power slots can advantageously be chosen to be irregular, as in the above example, so as to minimize ambiguity between different timing hypotheses. The four slots added together will then all correspond to higher power slots only when the correct hypothesis for slot 1 is used.

With a BCCH sub-multiplex frame duration of 470 ms and a 10 ppm timing drift due to oscillator errors or Doppler shift, a quarter-slot timing drift of 140 µs will occur over a period of 25 frames. If accumulation of slot-averaged RSSI samples over more than 25 frames is required to resolve coarse sync, as may occur for mobile terminals that are heavily shadowed from the transmitter, Applicant's dynamic programming process with a slope constraint of 1/25 may be used to ensure accumulation of corresponding quarter-slots.

A slope-constraint 1/25 dynamic programming process may be constructed by first accumulating corresponding quarter-slot RSSI samples over a 25-frame block lasting 25×470 ms≈11 s, thereby obtaining 4×816=3264 accumulated values. If upon combining hypotheses of the higher power slots, no result is produced that stands out as indicating the correct timing, and thus longer accumulation is needed, then further accumulations over 25-frame, 11-second periods are generated and combined with each other using Applicant's slope-constraint=1 dynamic programming algorithm that is described above. This is because the timing would be expected to drift by no more than quarter-slot position between successive 11-second accumulation periods.

Having achieved a coarse sync indication or candidate timing by this slope-constraint=1/25 dynamic programming method, three exemplary methods of achieving fine sync according to another aspect of Applicant's invention are described below.

Let the burst, or slot, format of the higher-power BCCH bursts be as illustrated in FIG. 9A. Each burst begins and ends with four power ramp-up/ramp-down bit periods (labeled 4$r$ in FIG. 9A) and three tail bit periods (labeled 3$t$). The main body of the burst comprises two blocks of sixty-four data bits separated by a 14-bit beam identification (ID) word that identifies the transmitting station or satellite and the antenna beam used for transmission. The other (lower power) BCCH bursts and the traffic bursts may have a slightly different format, such as that illustrated in FIG. 9B. The main bodies of these bursts each comprise two blocks of sixty data bits separated by a 22-bit codeword that is used for receiver synchronization.

The three exemplary methods of obtaining fine sync are as follows.

METHOD 1

Having identified the higher power BCCH bursts by one of the methods described above, combine corresponding bits of the 14-bit beam ID word across all higher power bursts as described above, using a dynamic programming process to compensate for timing drift, until the beam ID word emerges consistently in a particular bit-shift position. The beam ID word may or may not be known in advance, but if the beam ID word is known or can be limited to only a few of the 16384 possible patterns for the 14-bit word, an earlier identification can be made, or the amount of processing may be reduced correspondingly.

METHOD 2

The 22-bit sync codeword can be chosen to be always the same for normal BCCH bursts, of which there are forty-seven in each 51-frame BCCH period according to the above example. Therefore, despite their lower power than the four, special higher power bursts, accumulating corresponding bits across all forty-seven normal BCCH slots per BCCH frame can result in faster identification of fine timing because they are ten times more numerous. The number of hypothetical symbol timing positions to be tested is reduced by virtue of there having already been obtained a coarse sync estimate to no more than the number of bits in a burst, say, 128 maximum.

When either the 14-bit beam ID word or the 22-bit sync codeword is known, a correlation is made at a hypothesized bit timing and the correlation value is tested as follows. First, the relative phases of successive complex samples corresponding to successive bits of the known pattern are predicted using the known modulation parameters. Then, successive complex received samples hypothesized as corresponding to successive bits of the known pattern (i.e., 1–14 or 1–22) are rotated such that the rotated samples are aligned in phase. Finally, the rotated samples are added together to produce a sum whose magnitude indicates the degree of success in phase-aligning the samples according to the known pattern, thus obtaining the correlation value for the hypothesized bit timing.

The magnitudes of such complex correlation values may then be accumulated across different bursts known to contain the same pattern, using Applicant's slope-constrained dynamic programming process if necessary to compensate for timing drift over extended accumulation periods. For bit-level timing searches, an extended accumulation period would be at most of the order of the reciprocal of the clock accuracy in bits, e.g., at most of the order of 100 000 bit periods for a 10-ppm-error clock. (An accumulation period of 25 000 bit periods would be more desirable for such a clock.) This is of the order of one BCCH sub-multiplex frame, and thus the use of Applicant's slope-constrained dynamic programming process is needed to accumulate corresponding blt-level correlations over more than one BCCH sub-multiplex frame.

METHOD 3

This method of obtaining fine sync is based on heavily coding the 64-bit data portions of the higher power BCCH slots to carry low information rates with high link margin for very signal-strength disadvantaged mobiles. For example, the 2×64 data bits in a burst can form a (128,7) orthogonal Walsh codeword. Using a particular timing position hypothesis, the 128 data bit samples are subjected to a 128-point Fast Walsh transform. The transform bin having the largest value is selected as indicative of the most likely codeword, and that value is accumulated with others computed using corresponding timing positions from all bursts of similar format, using a slope-constrained dynamic programming process if necessary.

METHOD 4

Method 4 comprises any of Methods 1, 2, and 3 with the following additional steps for compensating for possible frequency inaccuracy as well as timing uncertainty. When frequency errors exist, the received signal exhibits a progressive phase rotation that adversely affects attempts to correlate the received signal with a known data pattern by phase-aligning samples of the sync word as described above.

One method of compensating for frequency error is disclosed in Swedish Patent No. 459 137 to Raith, which was cited and incorporated by reference above. The Raith patent discloses correlating a received signal with one or more distorted sync patterns produced by applying a phase slope or progressive "phase twist" to a nominal sync pattern. The phase twist is selected to correspond to a postulated frequency error. The distorted sync patterns, or "phase twisted" sync words, can be precomputed and stored for a range of possible frequency errors from a negative extreme to a positive extreme in uniform steps.

Alternatively, phase twisting can be applied to received data to remove a postulated frequency error prior to correlating with an "untwisted" sync pattern. Different phase twists can be used on the same received data to generate correlations for a range of postulated frequency errors as well as for a range of possible timings.

When frequency error is taken into account, therefore, each correlation of one slot's worth of received samples generates a two-dimensional array of correlation results corresponding to different timing postulates in one dimension and different frequency-error postulates in the other dimension. Such 2-D arrays are accumulated according to this aspect of the invention in order most rapidly to identify both fine sync timing and frequency error.

If it can be expected that no timing drift will occur over the accumulation period needed to identify timing reliably and that any frequency error will be constant over the accumulation period (i.e., the frequency drift will be less than that represented by the difference between two different frequency hypotheses tested), then it is sufficient to accumulate correlations from one frame to another by adding corresponding values, i.e., by adding values that correspond to the same frequency error and timing hypothesis.

If it is expected that a timing drift will occur over the accumulation period but that the frequency error will be constant, then values are accumulated by dynamic programming in the time dimension, while adding only corresponding values along the frequency dimension. That is, the correlation for frequency error i and timing j is accumulated with the largest of three previous cumulative values for frequency error i and timings j−1, j, and j+1, thus allowing for a timing drift of ±1 bin but no frequency drift.

If it is expected that both timing and frequency drifts will occur over the accumulation period, dynamic programming in both dimensions is used. The latest correlation for frequency error i and timing j is added to the best of nine previous accumulations for frequency errors i−1, i, and i+1 combined with timing errors j−1, j, and j+1, thus allowing for ±1 frequency-bin drift and ±1 timing-bin drift.

For a case in which the timing drift and frequency drift are correlated due to, for example, their both being caused by movement of a satellite (Doppler), then the dynamic programming process may associate a timing drift towards "late" with a frequency error on the low side and a timing drift towards "early" with a frequency error on the high side. In such a case, the "best of three" previous cumulative correlations corresponding to a high frequency error (i+1) and an early timing (j−1), a nominal frequency error (i) and a nominal timing (j), and a low frequency error (i−1) and a late timing (j+1) can be selected to be combined with a current correlation (i, j).

In general, it is better to use any knowledge about the real physical causes of timing and frequency error drifts to reduce the number of combinations tested, as this will result in a faster or more reliable identification of the frequency and/or timing error. For example, where timing drift is caused by a Doppler shift and frequency drift is caused by a rate-of-change of Doppler, they may be correlated by using information about a satellite's orbit in order to obtain more reliable synchronization.

The inventive uses of dynamic programming described above have been shown to be advantageous in detecting repeated characteristics in a weak signal, in cases where the exact repetition period of those characteristics is only known to a limited accuracy, thus hampering accumulation of corresponding measurements. The inventive technique allows measurements postulated to correspond due to assuming a repetition period to be accumulated with all postulates of the repetition period being tested simultaneously. Such measurements include signal strengths, correlation values, code characteristics, or other repetitive signal characteristics.

It has also been disclosed how deliberate cyclic variation of a repetitive signal characteristic, including variation of the repetition period itself in a predetermined pseudo-random or irregular pattern, can help to discriminate wrong postulates from the right one. All such techniques that employ dynamic programming to accumulate corresponding results from different cycles of a repeating event while testing several postulates of the repetition period or drift in the period for the purpose of obtaining synchronization with a signal transmitted by a transmitter having an error in the repetition period relative to the receiver are deemed to lie within the essence of Applicant's invention and its scope as described in the following claims.

It will be appreciated by those of ordinary skill in the art that this invention can be embodied in other specific forms without departing from its essential character. The embodiments described above should therefore be considered in all respects to be illustrative and not restrictive.

I claim:

1. In a receiver, a method of obtaining time synchronization with a predetermined portion of a signal broadcast by a transmitter, the predetermined portion being broadcast at predetermined repetition intervals, wherein the receiver determines the repetition intervals with errors, comprising the steps of:

sampling the signal and storing samples at respective locations in a memory, wherein the memory locations are identified by respective addresses;

selecting a postulate of addresses of memory locations in which samples corresponding to a first occurrence of the predetermined portion are likely to have been stored;

determining a succession of measurement values related to the predetermined portion from the samples stored in the memory locations identified by the postulate of addresses, wherein a first measurement value is determined from samples that begin at a starting address and the successive measurement values are determined by incrementing the starting address until all samples stored at the postulate of addresses have been used;

storing the succession of measurement values in memory locations having sequential addresses;

additively combining a selected one of measurement values stored in memory locations having a first group of sequential addresses with measurement values stored in memory locations having a second group of addresses, wherein the first group of addresses corresponds to measurement values determined from a first likely occurrence of the predetermined portion and the second group of addresses corresponds to measurement values determined from a subsequent likely occurrence of the predetermined portion, and the addresses in the first group are separated from the addresses in the second group by amounts corresponding to the repetition interval and in a range from the repetition interval less an uncertainty in the interval to the repetition interval plus the uncertainty in the interval; and determining an optimal one of the combined values, thereby obtaining time synchronization with the predetermined portion.

2. The method of claim 1, wherein the measurement values are signal strength values.

3. The method of claim 1, wherein the measurement values are determined by correlating samples with a known signal pattern.

4. The method of claim 3, wherein the known signal pattern is a digital code.

5. The method of claim 4, wherein the digital code is one of a set of orthogonal digital codes.

6. The method of claim 5, wherein the measurement values are determined by correlating samples with every digital code in the set of orthogonal digital codes.

7. The method of claim 6, wherein a Fast Walsh Transform is used for correlating samples with every digital code in the set of orthogonal digital codes.

8. The method of claim 1, wherein the step of additively combining comprises combining moduli of the measurement values.

9. The method of claim 1, wherein the selected one of the measurement values stored in memory locations having the first group of sequential addresses is the largest measurement value within the range from the repetition interval less the uncertainty to the repetition interval plus the uncertainty and centered on an address corresponding to the address of a measurement value stored in memory locations having the second group of addresses with which the largest measurement value is combined.

10. In a receiver, a method of obtaining time synchronization with characteristic portions of a signal broadcast repetitively by a transmitter at predetermined repetition intervals, comprising the steps of:

receiving the broadcast signal and storing samples of the received broadcast signal at respective locations in a memory, each memory location being identified by a respective address;

postulating a region of addresses identifying memory locations in which samples corresponding to a first occurrence of the characteristic portion are likely to be found;

determining a first measurement value corresponding to the first occurrence of the characteristic portion using samples stored in memory locations having addresses in the postulated address region and beginning with a start address;

determining succeeding measurement values by incrementing the start address until substantially all sample values have been used and storing the first and succeeding measurement values in respective memory locations having successive addresses;

replacing each measurement value or already replaced measurement value in a first group of measurement values or already replaced measurement values stored in memory locations having sequential addresses by a combination of the measurement value or already replaced measurement value and a selected one of a second group of measurement values stored in memory locations having earlier addresses, wherein the addresses of the second group are separated from the addresses of the first group by amounts that correspond substantially to the repetition interval and are in a range from the repetition interval minus an uncertainty in the repetition interval to the repetition interval plus the uncertainty in the interval; and the replacing starts at a first address for which such a second group exists; and determining an optimal one of the replaced values, thereby obtaining time synchronization with the repetitive characteristic portion.

11. The method of claim 10, wherein the first and succeeding measurement values are signal strength values.

12. The method of claim 10, wherein the first and succeeding measurement values are determined by correlating samples with a known signal pattern.

13. The method of claim 12, wherein the known signal pattern is a digital code.

14. The method of claim 13, wherein the digital code is one of a set of orthogonal digital codes.

15. The method of claim 14, wherein the first and succeeding measurement values are determined by correlating samples with every digital code in the set of orthogonal digital codes.

16. The method of claim 15, wherein a Fast Walsh Transform is used for correlating samples with every digital code in the set of orthogonal digital codes.

17. The method of claim 10, wherein the combinations are formed by adding moduli of the measurement values.

18. A method of estimating a frequency error between a transmitter and a receiver based on a characteristic portion of a signal broadcast repetitively by the transmitter at predetermined repetition intervals, comprising the steps of:

generating samples of the signal and storing the samples in a memory;

postulating a region of addresses identifying locations in the memory where samples corresponding to an occurrence of the characteristic portion are likely to start to be found;

determining a first measurement value related to the characteristic portion using samples stored in memory locations having addresses in the postulated region;

determining succeeding measurement values related to the characteristic portion by incrementing a start address in the postulated region until all samples stored at memory locations having addresses in the postulated region have been used and storing the first and succeeding measurement values in memory locations having successive memory addresses;

initializing a plurality of counters that are associated with respective ones of the memory values;

additively combining measurement values selected from memory locations having sequential addresses in the memory with a selected one of a group of measurement values stored in memory locations having addresses corresponding to an earlier occurrence of the characteristic portion, wherein the addresses of the measurement values in the group are separated from the addresses of the selected measurement values by amounts corresponding to the repetition interval and in a range from the repetition interval less an uncertainty in the interval to the repetition interval plus the uncertainty in the interval;

transferring a counter value associated with the selected one of the group of measurement values to the counter associated with the selected one after incrementing or decrementing the counter value according to which of the group was selected;

determining an optimal one of the additively combined values; and obtaining a frequency error estimate based on the counter value associated with the optimal one.

19. The method of claim 18, wherein the measurement values are determined by correlating samples with a known signal pattern.

20. The method of claim 19, wherein the known signal pattern is a digital code.

21. The method of claim 20, wherein the digital code is one of a set of orthogonal digital codes.

22. The method of claim 18, wherein the counter value associated with the selected one is incremented by a number of addresses that the selected one lies from a nominal location if the counter value is associated with an earlier timing, is decremented by the number of addresses if the counter value is associated with a later timing, and is unchanged if the optimal one lies at the nominal location.

23. In a receiver, a method of estimating a frequency error between a transmitter and the receiver based on a signal characteristic broadcast repetitively by the transmitter at predetermined repetition intervals, comprising the steps of:

sampling a received signal characteristic and storing the samples in respective locations in a memory;

postulating a region of addresses identifying memory locations where samples of an occurrence of signal characteristic are likely to start;

determining a measurement value related to the signal characteristic using samples stored in locations having addresses in the postulated region of addresses;

determining succeeding measurement values by incrementing a start address until all sample values stored in memory locations having addresses in the postulated region have been used and storing the measurement values in memory locations having successive addresses;

initializing a plurality of counters associated with the measurement values;

replacing each measurement value or already replaced measurement value in a first group of measurement values or already replaced measurement values stored in memory locations having sequential addresses by a combination of the measurement value or already replaced measurement value and a selected one of a second group of measurement values stored in memory locations having earlier addresses, wherein the addresses of the second group are separated from the addresses of the first group by amounts that correspond substantially to the repetition interval and are in a range from the repetition interval less an uncertainty in the interval to the repetition interval plus the uncertainty in the interval, starting at a first address for which such a second group exists;

transferring a counter value associated with the selected one of the second group of measurement values to the counter associated with the selected one after incrementing or decrementing the counter value according to which of the group was selected;

determining an optimal one of the replaced values; and determining a frequency error estimate based on the counter value associated with the optimal one.

24. The method of claim 23, wherein the measurement values are determined by correlating samples with a known signal pattern.

25. The method of claim 24, wherein the known signal pattern is a digital code.

26. The method of claim 25, wherein the digital code is one of a set of orthogonal digital codes.

27. The method of claim 23, wherein the counter value associated with the selected one is incremented by a number of addresses that the selected one lies from a nominal location if the counter value is associated with an earlier timing, is decremented by the number of addresses if the counter value is associated with a later timing, and is unchanged if the optimal one lies at the nominal location.

28. A method of time synchronizing a receiver with a signal characteristic broadcast repetitively by a transmitter at predetermined repetition intervals, comprising the steps of:

storing samples of a broadcast signal characteristic in locations in a memory;

postulating a region of addresses identifying memory locations where samples of the signal characteristic are likely to start;

determining a measurement value related to the signal characteristic based on samples from the postulated region of addresses;

determining succeeding measurement values by incrementing a start address until all sample values having addresses in the postulated region have been used and storing the measurement values in memory locations having successive addresses;

determining cumulative measurement values associated with the measurement values by combining each measurement value with a selected one of a group of measurement values stored in memory locations having addresses separated by amounts corresponding to the repetition interval and in a range from the repetition interval less an uncertainty in the interval to the repetition interval plus the uncertainty in the interval, starting at a first address for which such a group exists; and determining an optimal one of the cumulative measurement values, thereby obtaining synchronization with the signal characteristic.

29. A method of time synchronizing a receiver with a signal characteristic broadcast repetitively by a transmitter at predetermined repetition intervals, comprising the steps of:

receiving the signal characteristic and storing samples of the received signal characteristic in locations in a memory;

postulating a region of addresses of memory locations where samples of a first occurrence of the signal characteristic are likely to start;

determining a measurement value related to the signal characteristic from samples stored in memory locations having addresses in the postulated address region;

determining succeeding measurement values by incrementing a start address until all stored samples have been used and storing the measurement values in memory locations having successive addresses;

determining cumulative measurement values associated with the stored measurement values by combining each stored measurement value with a selected one of a group of measurement values and cumulative measurement values, the group being stored in memory locations having addresses separated by amounts corresponding to the repetition interval and in a range from the repetition interval less an uncertainty in the interval to the repetition interval plus the uncertainty in the interval, starting at a first address for which such a group exists; and determining an optimal one of the cumulative measurement values, thereby obtaining synchronization with the signal characteristic.

30. A method of time synchronizing a receiver and obtaining an estimate of a synchronization error based on a signal characteristic broadcast repetitively by a transmitter at predetermined repetition intervals, comprising the steps of:

receiving the signal characteristic and storing samples of the signal characteristic in locations in a memory;

postulating an address region in the memory, wherein the address region includes addresses that identify memory locations where samples corresponding to a first occurrence of the signal characteristic are likely to start;

determining a measurement value related to the signal characteristic from samples retrieved from memory locations having addresses in the postulated address region;

determining succeeding measurement values by incrementing a start address until all sample values have been used and storing the measurement values in memory locations having successive addresses;

initializing a plurality of counters that are associated with respective ones of the measurement values;

determining cumulative measurement values associated with the stored measurement values by combining each stored measurement value with a selected one of a group comprising at least either measurement values or cumulative measurement values, the group being stored at earlier addresses separated by amounts corresponding to the repetition interval and in a range from the repetition interval less an uncertainty in the interval to the repetition interval plus the uncertainty in the interval, starting at a first address for which such a group exists;

transferring a counter value associated with the selected one of the group to the counter associated with a measurement value after incrementing or decrementing the counter value according to which of the group was selected; and determining an optimal one of the cumulative values, thereby obtaining time synchronization with the signal characteristic, and obtaining an error estimate based on the counter value associated with the optimal one.

31. The method of claim 30, wherein the counter value associated with the selected one is incremented by a number of addresses that the selected one lies from a nominal location if the counter value is associated with an earlier timing, is decremented by the number of addresses if the counter value is associated with a later timing, and is unchanged if the optimal one lies at the nominal location.

32. A method of providing coarse time synchronization to time division multiple access (TDMA) transmissions from a communication satellite to a receiving terminal, comprising:

transmitting from the communication satellite a sequence of signals occupying sequential time slots in a TDMA frame;

designating at least one of the time slots in the TDMA frame for transmitting a synchronization signal;

transmitting a succession of TDMA frames in which the designated time slots in certain frames are transmitted at a higher power level according to a pattern that is known to the communication satellite and the receiving terminal;

receiving the signal sequence and averaging a received signal power over a sliding time window one time slot in duration to obtain measurements of slot energy at a succession of time intervals;

storing the slot energy measurements for a plurality of TDMA frames in a memory having addressable storage locations, a memory address for a given slot energy measurement corresponding to the sliding time window's position for the measurement;

determining a cumulative energy result corresponding to a memory address postulate by the steps of:

postulating a memory address at which a slot energy measurement for one of the designated time slots is stored;

determining, based on the postulated memory address and the pattern, memory addresses of other slot energy measurements for other designated time slots;

combining the slot energy measurements stored at the postulated memory address and the determined memory addresses to obtain a cumulative energy result for the postulated address over an energy accumulation period equal to a duration of the plurality of TDMA frames; and storing the cumulative energy result in a memory location corresponding to the postulated address;

determining cumulative energy results corresponding to respective different memory address postulates; and finding a largest of the cumulative energy results, thereby determining a most likely location of a designated slot in the received signal sequence.

33. The method of claim 32, wherein the pattern is a regular pattern in which designated time slots are separated by a fixed number of TDMA frames.

34. The method of claim 32, wherein the pattern is a pattern in which designated time slots are separated by a variable number of TDMA frames to reduce ambiguity in determining the most likely location of a designated slot.

35. The method of claim 32, wherein the step of determining memory addresses of other slot energy measurements includes a step of compensating for timing drift over the duration of the plurality of TDMA frames.

36. The method of claim 35, wherein the compensating step includes a step of adding a slot energy measurement to a previous cumulative energy measurement to obtain a new cumulative energy measurement, the previous cumulative energy measurement being the largest of a plurality of adjacent previous cumulative energy measurements.

37. A method of providing fine time synchronization and frequency synchronization to time division multiple access (TDMA) transmissions from a communications satellite to a receiving terminal, comprising:

transmitting from the satellite a succession of superframes, each superframe comprising a succession of TDMA frames and each TDMA frame comprising a succession of time slots, wherein a sequence of signals occupies sequential time slots in each TDMA frame;

designating at least one of the time slots in each superframe for transmitting a synchronization signal comprising a known symbol pattern;

identifying at the receiving terminal a first occurrence of the designated time slot with a coarse accuracy of better than half a time slot, sampling a received transmission during the first occurrence, and storing the samples in a memory;

postulating a frequency error and compensating the stored samples for the postulated frequency error;

determining correlations of the known symbol pattern with respective different time shifts of the compensated stored samples, the time shifts comprising stored samples selected according to a range from an earliest possible occurrence of the known symbol pattern to a latest possible occurrence of the known symbol pattern;

determining correlations of the known symbol pattern with the different time shifts for different frequency error postulates in steps from a lowest frequency or most negative error to a highest frequency or most positive error;

storing the correlations in a two-dimensional table, one table dimension representing the different time shifts and the other table dimension representing the different frequency error postulates;

accumulating correlations from successive occurrences of the designated time slot by adding correlations corresponding to the same frequency error postulate and time shift, and producing a cumulative correlation table; and identifying a largest cumulative correlation in the cumulative correlation table, thereby providing frequency and time synchronization.

38. The method of claim 37, wherein the accumulating step includes compensating for possible timing drift over an accumulation period by adding a latest correlation from a latest occurrence of the designated time slot to a largest of a plurality of previous cumulative correlations corresponding to adjacent time shifts and corresponding to the same frequency error postulate as the latest correlation in order to obtain a new cumulative correlation.

39. The method of claim 37, wherein the accumulating step includes compensating for possible frequency drift over an accumulation period by adding a latest correlation from a latest occurrence of the designated time slot to a largest of a plurality of previous cumulative correlations corresponding to adjacent frequency error postulates and corresponding to the same time shift as the latest correlation in order to obtain a new cumulative correlation.

40. The method of claim 37, wherein the accumulating step includes compensating for possible frequency and timing drift over an accumulation period by adding a latest correlation from a latest occurrence of the designated time slot to a largest of a plurality of previous cumulative correlations corresponding to adjacent frequency error postulates and time shifts in order to obtain a new compensated cumulative correlation.

41. A method of time synchronizing a receiver with a signal characteristic broadcast repetitively by a transmitter at known repetition intervals, comprising the steps of:

storing samples of the signal characteristic in an addressable memory in the receiver;

making postulates of an address region in the addressable memory identifying samples of a first occurrence of the signal characteristic;

determining a succession of measurement values related to the signal characteristic using respective groups of samples from the postulated address region by incrementing a start address until all samples have been used;

storing the succession of measurement values at successive memory addresses in the addressable memory;

computing first candidate new values respectively associated with each of the stored measurement values by selecting each stored measurement value in turn from sequential addresses and combining each selected stored measurement value with a measurement value or an available associated new value computed from an earlier address corresponding to a nominal estimate of the repetition interval;

computing second candidate new values respectively associated with each of the stored measurement values by selecting each stored measurement value in turn from sequential addresses and combining each selected stored measurement value with a measurement value or an available associated new value computed from an earlier address corresponding to the nominal estimate plus an uncertainty in the repetition interval and with a new value computed from an earlier address corresponding to twice the nominal estimate plus the uncertainty in the repetition interval;

computing third candidate new values respectively associated with each of the stored measurement values by selecting each stored measurement value in turn from sequential addresses and combining each selected stored measurement value with a measurement value or an available associated new value computed from an earlier address corresponding to the nominal estimate minus the uncertainty and with a new value computed from an earlier address corresponding to twice the nominal estimate minus the uncertainty;

selecting best ones of the first, second, and third candidate new values as new values associated with each respective measurement value, whereby new values are associated with all of the measurement values;

determining the best of the new values, thereby time synchronizing the receiver with the signal characteristic.

42. A method of time synchronizing a receiver with a signal characteristic broadcast repetitively by a transmitter at known repetition intervals, comprising the steps of:

storing samples of the broadcast signal characteristic in an addressable memory;

making postulates of a region of addresses in the addressable memory where samples corresponding to a first occurrence of the signal characteristic are likely to start;

determining a measurement value related to the signal characteristic using samples stored in the memory at addresses in the postulated region, beginning with a start address, and determining successive measurement values by incrementing the start address;

storing the measurement values in an addressable memory at successive memory addresses;

initializing a plurality of counters respectively associated with the stored measurement values;

computing a first candidate new value associated with each of the measurement values selected in turn from sequential addresses by combining the selected measurement value with a measurement value or an available associated candidate new value stored at an earlier address that corresponds to a nominal estimate of the repetition interval and associating the counter associated with the earlier address with the first candidate new value;

computing a second candidate new value associated with each of the measurement values selected in turn from sequential addresses by combining the selected measurement value with a measurement value or an available associated candidate new value stored at an earlier address that corresponds to the nominal estimate plus an uncertainty in the repetition interval and with a new value computed from an earlier address corresponding to twice the nominal estimate plus the uncertainty and associating the counter associated with the latter new value with the second candidate new value;

computing a third candidate new value associated with each of the measurement values selected in turn from sequential addresses by combining the selected measurement value with a measurement value or an available associated candidate new value stored at an earlier address corresponding to the nominal estimate minus the uncertainty and with a new value computed from an earlier address corresponding to twice the nominal estimate minus the uncertainty and associating the counter associated with the latter new value with the third candidate new value;

selecting the best of the first, second, and third candidate values as a new value associated with the selected measurement value;

transferring the counter value associated with the selected best candidate value to the counter value associated with the new value after incrementing the counter value by one when the third candidate value was selected as the best value and decrementing the counter value by one when the second candidate value was selected as the best value;

repeating the computing, selecting, and transferring steps until all stored measurement values have been selected and new values and counter values have been associated with each;

determining the best of the new values, thereby time synchronizing with the signal characteristic, and using the associated counter value to obtain a frequency error estimate.

43. The method of claim 42, wherein the measurement values are signal strength values.

44. The method of claim 42, wherein the measurement values are determined by correlating samples with a known signal pattern.

45. The method of claim 44, wherein the known signal pattern is a digital code.

46. The method of claim 45, wherein the digital code is one of a set of orthogonal digital codes.

47. The method of claim 46, wherein the measurement values are determined by correlating samples with every digital code in the set.

48. The method of claim 47, wherein samples are correlated with digital codes by determining a Fast Walsh Transform.

49. The method of claim 42, wherein the combining steps comprise the step of adding moduli of combined values.

50. A method of facilitating coarse timing synchronization of a receiving station with a signal transmitted by a transmitting station, comprising the steps of:

transmitting a time division multiplex (TDMA) signal comprising a succession of TDMA frames, wherein each TDMA frame includes a first number of TDMA timeslots, at least one TDMA timeslot in each frame includes broadcast information, and the TDMA timeslots in in successive frames form a repetitive pattern, the repetitive pattern repeating with a period of a second number of frames;

varying a power level at which certain ones of the TDMA timeslots including broadcast information are transmitted in the repetitive pattern such that corresponding TDMA timeslots in successive repeats of the repetitive pattern are transmitted at the same power level;

measuring in the receiving station a received strength of the TDMA signal over successive timeslots;

accumulating a current TDMA signal strength measurement with TDMA signal strength measurements made at corresponding time positions in previous repeats of the repetitive pattern, thereby forming accumulated values; and determining a highest accumulated value, the highest accumulated value indicating coarse timing synchronization.

51. The method of claim 50, wherein the accumulating step comprises the step of determining a corresponding time position in a previous repeat of the repetitive pattern based on a largest of three previous accumulated values.

52. The method of claim 51, wherein the three previous accumulated values correspond to neighboring time positions, whereby time drift over an accumulation period is accounted for.

53. The method of claim 50, wherein the step of determining a highest accumulated value further comprises the step of combining selected accumulated values having predetermined time spacings that are equal to known time spacings at which the TDMA signal is transmitted at a relatively higher power level.

54. A method of facilitating coarse timing synchronization of a receiving station with a signal transmitted by a transmitting station, comprising the steps of:

transmitting from said transmitting station a time division multiplex signal (TDMA signal) comprising repetitive TDMA frame periods each containing a first number of TDMA timeslots, at least one of which slots in every frame contains broadcast information (BCCH slots) and others may or may not contain traffic information, and wherein said BCCH slots in successive frames furthermore form a repetitive pattern over a period of a second number of frames;

varying the transmitted power level of certain of said BCCH slots within said repetitive pattern such that corresponding slots in successive repeats of said pattern use the same power;

forming in said receiving system measurements of received signal strength over successive timeslots;

accumulating said measurements with measurements made at corresponding time positions in previous repeats of said pattern over a second number of pattern repeats to form a block accumulation for each time position;

further accumulating values from a current block accumulation with corresponding values from previous block accumulations to produce extended accumulation values for each time position; and determining the highest of said extended accumulation values as indicative of coarse timing synchronization.

55. The method of claim 54, wherein the further accumulating step comprises determining that a corresponding value from a previous block accumulation to be accumulated with a value from a current block accumulation is indicated by the largest of three of the extended accumulation values.

56. The method of claim 55, wherein the three previous extended accumulation values correspond to neighboring time positions, whereby time drift over the extended accumulation period is accounted for.

57. The method of claim 54, wherein the step of determining a highest extended accumulation value further comprises combining selected extended accumulated values with predetermined time spacings equal to the known time spacings at which the TDMA signal is transmitted at a high power level.

58. In a receiving system, a method of providing fine synchronization with a signal transmitted by a transmitting system, comprising the steps of:

transmitting from said transmitting station a time division multiplex signal (TDMA signal) comprising repetitive TDMA frame periods each containing a first number of TDMA timeslots, at least one of which slots in every frame contains broadcast information (BCCH slots) and others may or may not contain traffic information, and wherein said BCCH slots in successive frames furthermore form a repetitive pattern over a period of a second number of frames;

varying the format of bits or symbols in certain of said BCCH slots within said repetitive pattern such that corresponding slots in successive repeats of said pattern use the same format, and at least one of said various formats contains a fixed word being a number of bits or symbols always having the same values;

postulating a number of fine symbol timing position and correlating received samples with said fixed word starting at said postulated position to obtain a correlation value for each of said postulated timing positions;

accumulating the magnitudes of said correlation values for corresponding timing positions within different slots that correspond to the same format to produce a cumulative correlation for each postulated fine timing position; and determining the highest cumulative correlation as indicative of fine timing synchronization.

59. The method of claim 58, wherein the accumulating step comprises determining that a corresponding timing position is indicated by the largest of three of the cumulative correlation values.

60. The method of claim 59, wherein the three cumulative correlation values correspond to neighboring symbol-timing positions, whereby time drift over the accumulation period is accounted for.

* * * * *